US010929764B2

(12) United States Patent
Grimm et al.

(10) Patent No.: US 10,929,764 B2
(45) Date of Patent: Feb. 23, 2021

(54) BOOLEAN SATISFIABILITY

(71) Applicant: Micron Technology, Inc., Boise, ID (US)

(72) Inventors: Matthew T. Grimm, Boise, ID (US); Jeffery M. Tanner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 744 days.

(21) Appl. No.: 15/692,985

(22) Filed: Aug. 31, 2017

(65) Prior Publication Data

US 2018/0114131 A1   Apr. 26, 2018

Related U.S. Application Data

(60) Provisional application No. 62/410,722, filed on Oct. 20, 2016.

(51) Int. Cl.
*G06N 5/04* (2006.01)
*G06N 5/00* (2006.01)

(52) U.S. Cl.
CPC ............. *G06N 5/047* (2013.01); *G06N 5/003* (2013.01)

(58) Field of Classification Search
None
See application file for complete search history.

(56) References Cited

U.S. PATENT DOCUMENTS

| | | | |
|---|---|---|---|
| 3,849,762 A | 11/1974 | Fujimoto et al. |
| 3,921,136 A | 11/1975 | Bar-Lev |
| 4,011,547 A | 3/1977 | Kimmel |
| 4,014,000 A | 3/1977 | Uno et al. |
| 4,123,695 A | 10/1978 | Hale et al. |
| 4,153,897 A | 5/1979 | Yasuda et al. |
| 4,204,193 A | 5/1980 | Schroeder |
| 4,414,685 A | 11/1983 | Sternberg |
| 4,748,674 A | 5/1988 | Freeman |
| 5,014,327 A | 5/1991 | Potter et al. |
| 5,028,821 A | 7/1991 | Kaplinsky |
| 5,216,748 A | 6/1993 | Quenot et al. |
| 5,257,361 A | 10/1993 | Doi et al. |

(Continued)

FOREIGN PATENT DOCUMENTS

| | | |
|---|---|---|
| EP | 0476159 A1 | 3/1992 |
| EP | 0943995 A2 | 9/1999 |

(Continued)

OTHER PUBLICATIONS

Beesley, K. R.; Arabic Morphology Using Only Finite-State Operations; Xerox Research Centre Europe; pp. 50-57; 1998.

(Continued)

*Primary Examiner* — Michael D. Yaary
(74) *Attorney, Agent, or Firm* — Fletcher Yoder, P.C.

(57) ABSTRACT

An apparatus includes a state machine engine. The state machine engine may also include an automaton, whereby the automaton is configured to analyze data from a beginning of an input data stream until a point when an end of data signal is seen. The automaton may further be configured to report an event representative of a satisfaction of a Boolean clause of a conjunctive normal form (CNF) Boolean expression representative of a Boolean Satisfiability problem (SAT) by a portion of the input data stream.

30 Claims, 12 Drawing Sheets

(56) References Cited

U.S. PATENT DOCUMENTS

| | | | |
|---|---|---|---|
| 5,287,523 A | 2/1994 | Allison et al. | |
| 5,291,482 A | 3/1994 | McHarg et al. | |
| 5,300,830 A | 4/1994 | Hawes | |
| 5,331,227 A | 7/1994 | Hawes | |
| 5,357,512 A | 10/1994 | Khaira et al. | |
| 5,371,878 A | 12/1994 | Coker | |
| 5,377,129 A | 12/1994 | Molvig et al. | |
| 5,459,798 A | 10/1995 | Bailey et al. | |
| 5,615,237 A | 3/1997 | Chang et al. | |
| 5,659,551 A | 8/1997 | Huott et al. | |
| 5,723,984 A | 3/1998 | Sharpe-Geisler | |
| 5,754,878 A | 5/1998 | Asghar et al. | |
| 5,790,531 A | 8/1998 | Ellebracht et al. | |
| 5,881,312 A | 3/1999 | Dulong | |
| 5,896,548 A | 4/1999 | Ofek | |
| 5,956,741 A | 9/1999 | Jones | |
| 6,011,407 A | 1/2000 | New | |
| 6,016,361 A | 1/2000 | Hongu et al. | |
| 6,034,963 A | 3/2000 | Minami et al. | |
| 6,041,405 A | 3/2000 | Green | |
| 6,052,766 A | 4/2000 | Betker et al. | |
| 6,058,469 A | 5/2000 | Baxter | |
| 6,059,837 A * | 5/2000 | Kukula | G06F 30/3323 703/27 |
| 6,151,644 A | 11/2000 | Wu | |
| 6,240,003 B1 | 5/2001 | McElroy | |
| 6,279,128 B1 | 8/2001 | Arnold et al. | |
| 6,317,427 B1 | 11/2001 | Augusta et al. | |
| 6,362,868 B1 | 3/2002 | Silverbrook | |
| 6,400,996 B1 | 6/2002 | Hoffberg et al. | |
| 6,606,699 B2 | 8/2003 | Pechanek et al. | |
| 6,614,703 B2 | 9/2003 | Pitts et al. | |
| 6,625,740 B1 | 9/2003 | Datar et al. | |
| 6,633,443 B1 | 10/2003 | Watanabe et al. | |
| 6,636,483 B1 | 10/2003 | Pannell | |
| 6,640,262 B1 | 10/2003 | Uppunda et al. | |
| 6,697,979 B1 | 2/2004 | Vorbach et al. | |
| 6,700,404 B1 | 3/2004 | Feng et al. | |
| 6,880,087 B1 | 4/2005 | Carter | |
| 6,906,938 B2 | 6/2005 | Kaginele | |
| 6,944,710 B2 | 9/2005 | Regev et al. | |
| 6,977,897 B1 | 12/2005 | Nelson et al. | |
| 7,010,639 B2 | 3/2006 | Larson et al. | |
| 7,089,352 B2 | 8/2006 | Regev et al. | |
| 7,146,643 B2 | 12/2006 | Dapp et al. | |
| 7,176,717 B2 | 2/2007 | Sunkavalli et al. | |
| 7,276,934 B1 | 10/2007 | Young | |
| 7,305,047 B1 | 12/2007 | Turner | |
| 7,358,761 B1 | 4/2008 | Sunkavalli et al. | |
| 7,366,352 B2 | 4/2008 | Kravec et al. | |
| 7,392,229 B2 | 6/2008 | Harris et al. | |
| 7,428,722 B2 | 9/2008 | Sunkavalli et al. | |
| 7,487,131 B2 | 2/2009 | Harris et al. | |
| 7,487,542 B2 | 2/2009 | Boulanger et al. | |
| 7,499,464 B2 | 3/2009 | Ayrapetian et al. | |
| 7,685,547 B1 * | 3/2010 | Gupta | G06F 30/3323 716/106 |
| 7,725,510 B2 | 5/2010 | Alicherry et al. | |
| 7,774,286 B1 | 8/2010 | Harris | |
| 7,804,719 B1 | 9/2010 | Chirania et al. | |
| 7,890,923 B2 | 2/2011 | Elaasar | |
| 7,899,052 B1 | 3/2011 | Hao et al. | |
| 7,917,684 B2 | 3/2011 | Noyes et al. | |
| 7,970,964 B2 | 6/2011 | Noyes | |
| 8,015,530 B1 | 9/2011 | Sinclair et al. | |
| 8,020,131 B1 | 9/2011 | Van Mau et al. | |
| 8,065,249 B1 | 11/2011 | Harris et al. | |
| 8,140,780 B2 | 3/2012 | Noyes | |
| 8,146,040 B1 | 3/2012 | Janneck et al. | |
| 8,159,900 B2 | 4/2012 | Moore et al. | |
| 8,209,521 B2 | 6/2012 | Noyes et al. | |
| 8,239,660 B2 | 8/2012 | Cervini | |
| 8,281,395 B2 | 10/2012 | Pawlowski | |
| 8,294,490 B1 | 10/2012 | Kaviani | |
| 8,402,188 B2 | 3/2013 | Noyes et al. | |
| 8,536,896 B1 | 9/2013 | Trimberger | |
| 8,593,175 B2 | 11/2013 | Noyes et al. | |
| 8,648,621 B2 | 2/2014 | Noyes et al. | |
| 8,680,888 B2 | 3/2014 | Brown et al. | |
| 8,725,961 B2 | 5/2014 | Noyes | |
| 8,782,624 B2 | 7/2014 | Brown et al. | |
| 8,938,590 B2 | 1/2015 | Noyes et al. | |
| 9,058,465 B2 | 6/2015 | Noyes et al. | |
| 9,063,532 B2 | 6/2015 | Brown | |
| 9,075,428 B2 | 7/2015 | Brown | |
| 9,118,327 B2 | 8/2015 | Noyes et al. | |
| 9,235,798 B2 | 1/2016 | Brown et al. | |
| 2002/0186044 A1 | 12/2002 | Agrawal et al. | |
| 2003/0107996 A1 | 6/2003 | Black et al. | |
| 2003/0142698 A1 | 7/2003 | Parhl | |
| 2003/0163615 A1 | 8/2003 | Yu | |
| 2003/0226002 A1 | 12/2003 | Boutaud et al. | |
| 2004/0100980 A1 | 5/2004 | Jacobs et al. | |
| 2004/0125807 A1 | 7/2004 | Liu et al. | |
| 2004/0151211 A1 | 8/2004 | Snider | |
| 2004/0184662 A1 | 9/2004 | Kravec et al. | |
| 2005/0154916 A1 | 7/2005 | Boulanger et al. | |
| 2005/0251638 A1 | 11/2005 | Boutaud et al. | |
| 2006/0158219 A1 | 7/2006 | Sunkavalli et al. | |
| 2006/0195496 A1 | 8/2006 | Vadi et al. | |
| 2006/0206875 A1 | 9/2006 | Ullmann et al. | |
| 2006/0257043 A1 | 11/2006 | Chiu | |
| 2006/0274001 A1 | 12/2006 | Guttag et al. | |
| 2006/0288070 A1 | 12/2006 | Vadi et al. | |
| 2007/0005869 A1 | 1/2007 | Balraj et al. | |
| 2007/0075878 A1 | 4/2007 | Furodet et al. | |
| 2007/0127482 A1 | 6/2007 | Harris et al. | |
| 2007/0150623 A1 | 6/2007 | Kravec et al. | |
| 2007/0282833 A1 | 12/2007 | McMillen | |
| 2007/0283108 A1 | 12/2007 | Isherwood et al. | |
| 2008/0126690 A1 | 5/2008 | Rajan et al. | |
| 2008/0129334 A1 | 6/2008 | Sunkavalli et al. | |
| 2008/0133874 A1 | 6/2008 | Capek et al. | |
| 2008/0140661 A1 | 6/2008 | Pandya | |
| 2008/0178031 A1 | 7/2008 | Dong-Han | |
| 2008/0256347 A1 | 10/2008 | Eickemeyer et al. | |
| 2008/0320053 A1 | 12/2008 | Iijima et al. | |
| 2009/0198952 A1 | 8/2009 | Khmeinitsky et al. | |
| 2009/0204734 A1 | 8/2009 | Strait et al. | |
| 2009/0222393 A1 * | 9/2009 | Ganai | G06F 17/11 706/46 |
| 2010/0100691 A1 | 4/2010 | Noyes et al. | |
| 2010/0100714 A1 | 4/2010 | Noyes et al. | |
| 2010/0115173 A1 | 5/2010 | Noyes | |
| 2010/0115347 A1 | 5/2010 | Noyes | |
| 2010/0118425 A1 | 5/2010 | Rafaelof | |
| 2010/0138432 A1 | 6/2010 | Noyes | |
| 2010/0138575 A1 | 6/2010 | Noyes | |
| 2010/0138634 A1 | 6/2010 | Noyes | |
| 2010/0138635 A1 | 6/2010 | Noyes | |
| 2010/0175130 A1 | 6/2010 | Pawlowski | |
| 2010/0174887 A1 | 7/2010 | Pawlowski | |
| 2010/0174929 A1 | 7/2010 | Pawlowski | |
| 2010/0185647 A1 | 7/2010 | Noyes | |
| 2010/0197006 A1 * | 8/2010 | Benenson | C12N 15/10 435/325 |
| 2010/0145182 A1 | 10/2010 | Schmidt et al. | |
| 2010/0325352 A1 | 12/2010 | Schuette et al. | |
| 2010/0332809 A1 | 12/2010 | Noyes et al. | |
| 2011/0004578 A1 | 1/2011 | Momma et al. | |
| 2011/0145182 A1 | 6/2011 | Dlugosch | |
| 2011/0145544 A1 | 6/2011 | Noyes et al. | |
| 2011/0161620 A1 | 6/2011 | Kaminski et al. | |
| 2011/0208900 A1 | 8/2011 | Schuette et al. | |
| 2011/0258360 A1 | 10/2011 | Noyes | |
| 2011/0145271 A1 | 12/2011 | Noyes et al. | |
| 2011/0307233 A1 | 12/2011 | Tseng et al. | |
| 2011/0307433 A1 | 12/2011 | Dlugosch | |
| 2011/0307503 A1 | 12/2011 | Dlugosch | |
| 2011/0320759 A1 | 12/2011 | Craddock et al. | |
| 2012/0192163 A1 | 6/2012 | Glendenning et al. | |
| 2012/0179854 A1 | 7/2012 | Noyes | |
| 2012/0192164 A1 | 7/2012 | Xu et al. | |
| 2012/0192165 A1 | 7/2012 | Xu et al. | |

(56) References Cited

U.S. PATENT DOCUMENTS

| | | |
|---|---|---|
| 2012/0192166 A1 | 7/2012 | Xu et al. |
| 2013/0154685 A1 | 6/2013 | Noyes |
| 2013/0156043 A1 | 6/2013 | Brown et al. |
| 2013/0159239 A1 | 6/2013 | Brown et al. |
| 2013/0159670 A1 | 6/2013 | Noyes |
| 2013/0159671 A1 | 6/2013 | Brown et al. |
| 2013/0275709 A1 | 10/2013 | Gajapathy |
| 2014/0025614 A1 | 1/2014 | Noyes et al. |
| 2014/0025923 A1 | 1/2014 | Klein |
| 2014/0225889 A1 | 1/2014 | Brown et al. |
| 2014/0067736 A1 | 3/2014 | Noyes |
| 2014/0204956 A1 | 7/2014 | Brown et al. |
| 2014/0279776 A1 | 9/2014 | Brown et al. |
| 2014/0325494 A1 | 10/2014 | Brown et al. |
| 2015/0039664 A1* | 2/2015 | Iyer .................. G06N 5/003 708/446 |

FOREIGN PATENT DOCUMENTS

| | | |
|---|---|---|
| JP | 08087462 A | 4/1996 |
| JP | 10069459 A | 3/1998 |
| JP | 10111862 A | 4/1998 |
| JP | 2000231549 A | 8/2000 |
| JP | 2000347708 A | 12/2000 |
| KR | 1020080097573 A | 11/2008 |
| WO | WO0065425 A1 | 11/2000 |
| WO | WO0138978 A1 | 5/2001 |
| WO | WO03039001 A1 | 5/2003 |
| WO | WO2005036750 A1 | 4/2005 |
| WO | WO2011114120 A1 | 9/2011 |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE International Conference on Field Programmable Technology; 2006.

Bispo, J. et al.; Synthesis of Regular Expressions Targeting FPGAs: Current Status and Open Issues; IST/INESC-ID, Libson, Portugal; pp. 1-12; 2007.

Brodie, B. et al.; A scalable Architecture for High-Throughput Regular-Expression Pattern Matching; Exegy Inc.; pp. 1-12; 2006.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12th Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17; 2005.

Fide, S.; String Processing in Hardware; Scalable Parallel and Distributed Systems Lab; Proceedings of the 12th Annual IEEE symposium on Field-Programmable Custom Computing Machines (FCCM'04); School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21; 2002.

Korenek, J.; Traffic Scanner-Hardware Accelerated Intrusion Detection System; http://www.liberouter.org/ ; 2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12; 2001.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and KASPERSKY® Accelerated Antivirus Solution Platform for OEM Vendors; Freescale Semiconductors Document; pp. 1-16; 2007.

PCT/US2009/067534 International Search Report and Written Opinion dated Apr. 26, 2010.

PCT/US2009/061649 International Search Report dated Feb. 15, 2010.

Taiwan Application No. 098144804 Office Action dated Nov. 4, 2013.

PCT/US2012/067992 International Search Report dated Mar. 28, 2013.

PCT/US2012/068011 International Search Report dated Apr. 15, 2013.

PCT/US2012/067999 International Search Report dated May 14, 2013.

PCT/US2012/067995 International Search Report dated May 17, 2013.

PCT/US2012/067988 International Search Report (Partial) dated Jun. 24, 2014.

PCT/US2013/049744 International Search Report and Written Opinion dated Oct. 22, 2013.

PCT/US2013/049748 International Search Report and Written Opinion dated Oct. 22, 2013.

PCT/US2013/049755 International Search Report and Written Opinion dated Oct. 24, 2013.

PCT/US2013/049753 International Search Report and Written Opinion dated Nov. 7, 2013.

PCT/US2013/055434 International Search Report and Written Opinion dated Nov. 29, 2013.

PCT/US2013/055438 International Search Report and Written Opinion dated Nov. 29, 2013.

PCT/US2013/055436 International Search Report and Written Opinion dated Dec. 9, 2013.

PCT/US2014/023589 International Search Report and Written Opinion dated Jul. 24, 2014.

Soewito et al., "Self-Addressable Memory-Based FSM: A scalable Intrusion Detection Engine", IEEE Network, pp. 14-21; Feb. 2009.

Hurson A. R.; A VLSI Design for the Parallel Finite State Automation and Its Performance Evaluation as a Hardware Scanner; International Journal of Computer and Information Sciences, vol. 13, No. 6; 1984.

Carpenter et al., "A Massively Parallel Architecture for a Self-Organizing Neural Pattern Recognition Machine", Academic Press, Inc.; 1987.

Cong et al., "Application-Specific Instruction Generation for Configurable Processor Architectures", Computer Science Department, University of California, ACM; 2004.

Glette et al., "An Online EHW Pattern Recognition System Applied to Face Image Recognition", University of Oslo, Norway; 2007.

Kawai et al., "An Adaptive Pattern Recognition Hardware with On-chip Shift Register-based Partial Reconfiguration", IEEE; 2008.

Kutrib et al., "Massively Parallel Pattern Recognition with Link Features", IFIG Research Report 0003; 2000.

(56) References Cited

OTHER PUBLICATIONS

Marculescu et al., Power Management of Multi-Core Systems: Challenges, Approaches, and Recent Developments Tutorial at ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
Roy et al., "Finding Motifs in Biological Sequences using the Micron Automata Processor," IEEE, 2014.
U.S. Appl. No. 60/652,738, filed Feb. 12, 2005, Harris.
U.S. Appl. No. 61/788,364, filed Mar. 15, 2013, Brown.

\* cited by examiner

BOOLEAN SATISFIABILITY

CROSS REFERENCE TO RELATED APPLICATIONS

This application is a Non-Provisional application claiming priority to U.S. Provisional Patent Application No. 62/410,722, entitled "Boolean Satisfiability", filed Oct. 20, 2016, which is herein incorporated by reference.

BACKGROUND

Field of Invention

Embodiments relate generally to electronic devices and, more specifically, in certain embodiments, to electronic devices with parallel devices for data analysis.

Description of Related Art

Complex pattern recognition can be inefficient to perform on a conventional von Neumann based computer. A biological brain, in particular a human brain, however, is adept at performing pattern recognition. Current research suggests that a human brain performs pattern recognition using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex pattern recognition that enables humans to perform high level functions such as spatial reasoning, conscious thought, and complex language.

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. The system may then further process the results from these circuits, to arrive at the final results. These "intermediate results", however, can be larger than the original input data, which may pose issues for the system. The ability to use a cascaded circuits approach, similar to the human brain, offers one potential solution to this problem. However, there has not been a system that effectively allows for performing pattern recognition in a manner more comparable to that of a biological brain. Development of such a system is desirable.

DETAILED DESCRIPTION

Figure 1:
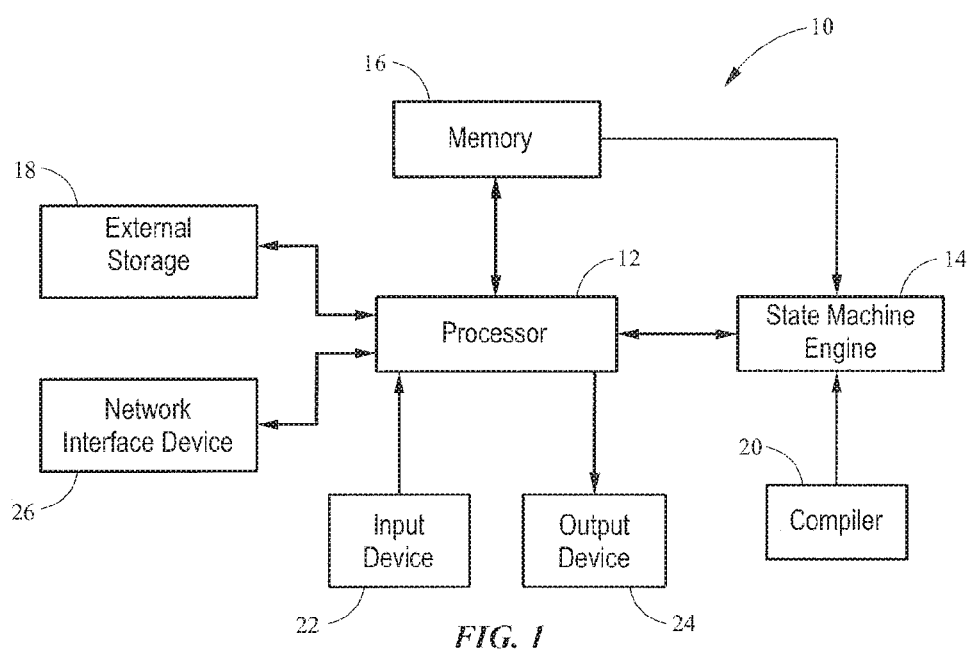
FIG. 1 illustrates an example of system having a state machine engine, according to various embodiments.

Turning now to the figures, FIG. 1 illustrates an embodiment of a processor-based system, generally designated by reference numeral 10. It should be noted that as used in the present application, an apparatus may be a device or a system. The system 10 may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. The state machine engine 14 may employ any one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of a chip). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition or other processing) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 110, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, issue, route, send, transfer, transmit, generate, give, make available, move, output, pass, place, read out, write, etc. Such devices may be referred to as or include solid state drives (SSD's), MultimediaMediaCards (MMC's), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state transition elements (STEs) 34, 36 (shown in FIG. 5) that are hierarchically organized into rows 38 (shown in FIGS. 3 and 4) and blocks 32 (shown in FIGS. 2 and 3). The STEs each may be considered an automaton, e.g., a machine or control mechanism designed to follow automatically a predetermined sequence of operations or respond to encoded instructions. Taken together, the STEs form an automata processor as state machine engine 14. To route signals between the hierarchically organized STEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A STE 34, 36 can correspond to a state of a FSM implemented by the FSM lattice 30. The STEs 34, 36 can be coupled together by using the configurable switching elements as described below. Accordingly, a FSM can be implemented on the FSM lattice 30 by configuring the STEs 34, 36 to correspond to the functions of states and by selectively coupling together the STEs 34, 36 to correspond to the transitions between states in the FSM.

Figure 2:
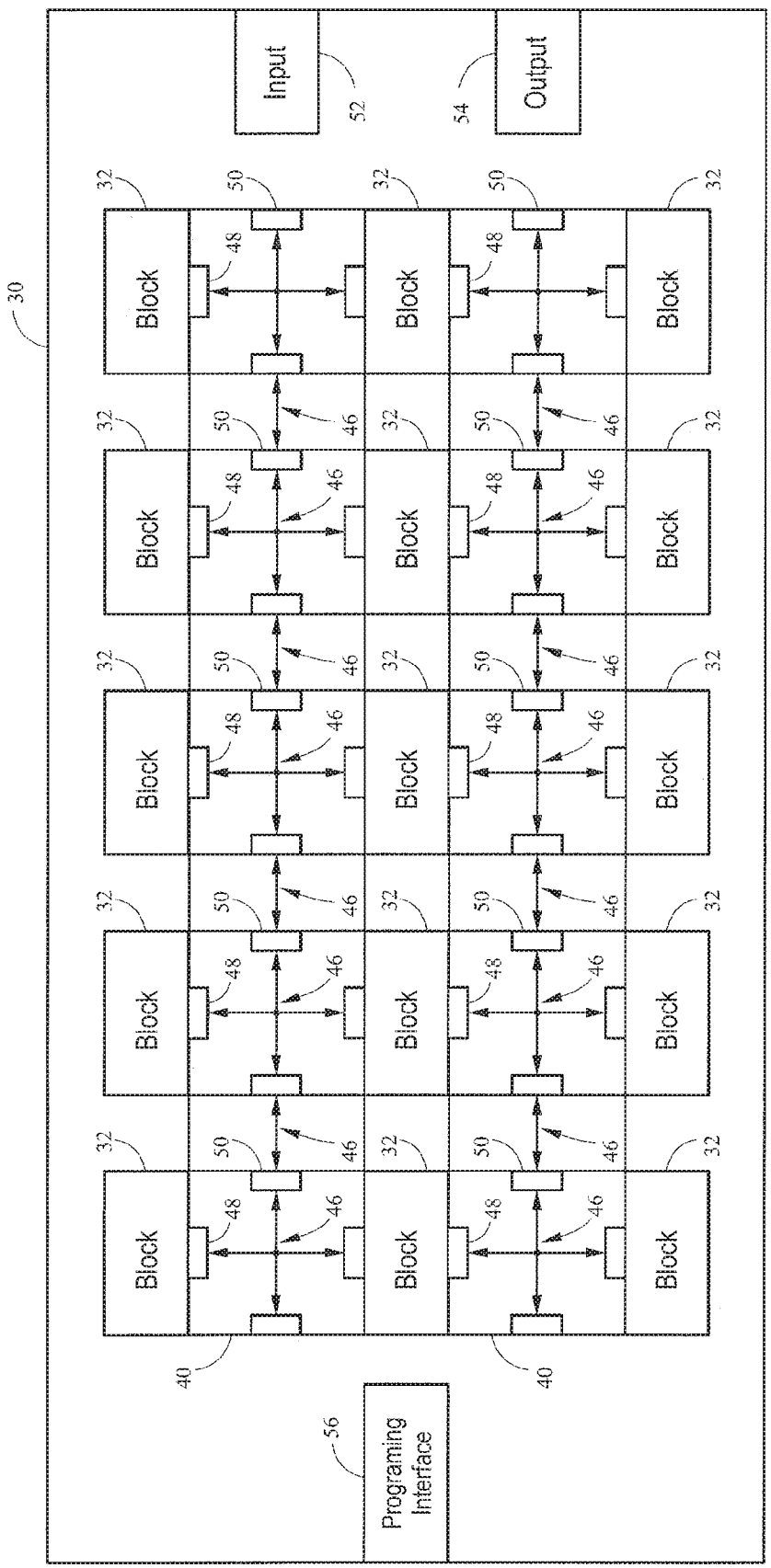
FIG. 2 illustrates an example of an FSM lattice of the state machine engine of FIG. 1, according to various embodiments.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48, 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the STEs 34, 36. For example, the image can configure the STEs 34, 36 to react in a certain way to a given input at the input block 52. For example, a STE 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the STEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
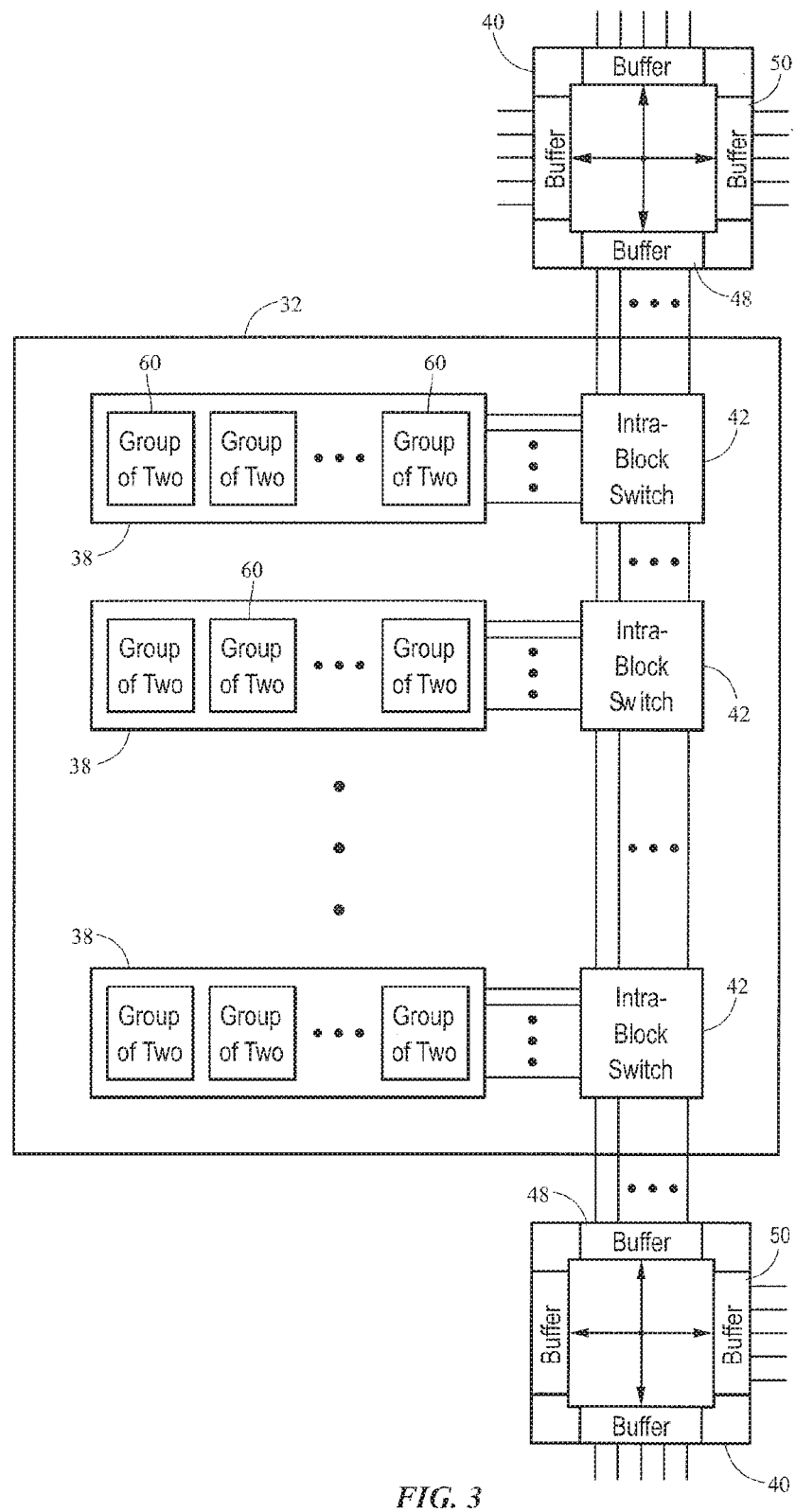
FIG. 3 illustrates an example of a block of the FSM lattice of FIG. 2, according to various embodiments.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of STEs 34, 36 organized into pairs of elements that are referred to herein as groups of two (GOTs) 60. In an example, a block 32 comprises sixteen (16) rows 38.

Figure 4:
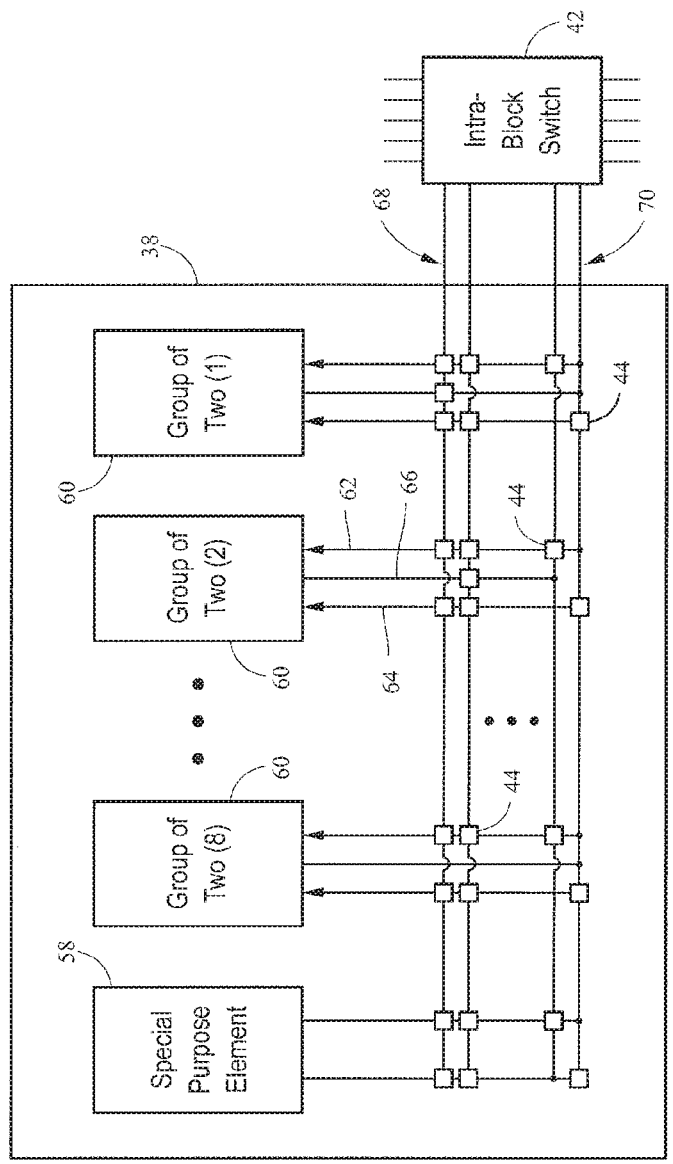
FIG. 4 illustrates an example of a row of the block of FIG. 3, according to various embodiments.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first STE 34 of the GOT 60 and the second input 64 is coupled to a second STE 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each STE 34, 36 of each GOT 60 within the row 38. A second plurality of the row interconnection conductors 70 can be coupled to only one STE 34, 36 of each GOT 60 within the row 38, but cannot be coupled to the other STE 34, 36 of the GOT 60. In an example, a first half of the second plurality of row interconnection conductors 70 can couple to first half of the STEs 34, 36 within a row 38 (one STE 34 from each GOT 60) and a second half of the second plurality of row interconnection conductors 70 can couple to a second half of the STEs 34, 36 within a row 38 (the other STE 34, 36 from each GOT 60), as will be better illustrated with respect to FIG. 5. The limited connectivity between the second plurality of row interconnection conductors 70 and the STEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter 58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero. For example, the zero-count output is asserted during the processing of an immediately subsequent next data byte, which results in the counter 58 being offset in time with respect to the input character cycle. After the next character cycle, the zero-count output is no longer asserted. In this manner, for example, in the pulse mode, the zero-count output is asserted for one input character processing cycle. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sume (NPoS), and Product of Sums (PoS) functions. This Boolean logic can be used to extract data from terminal state STEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 4A:
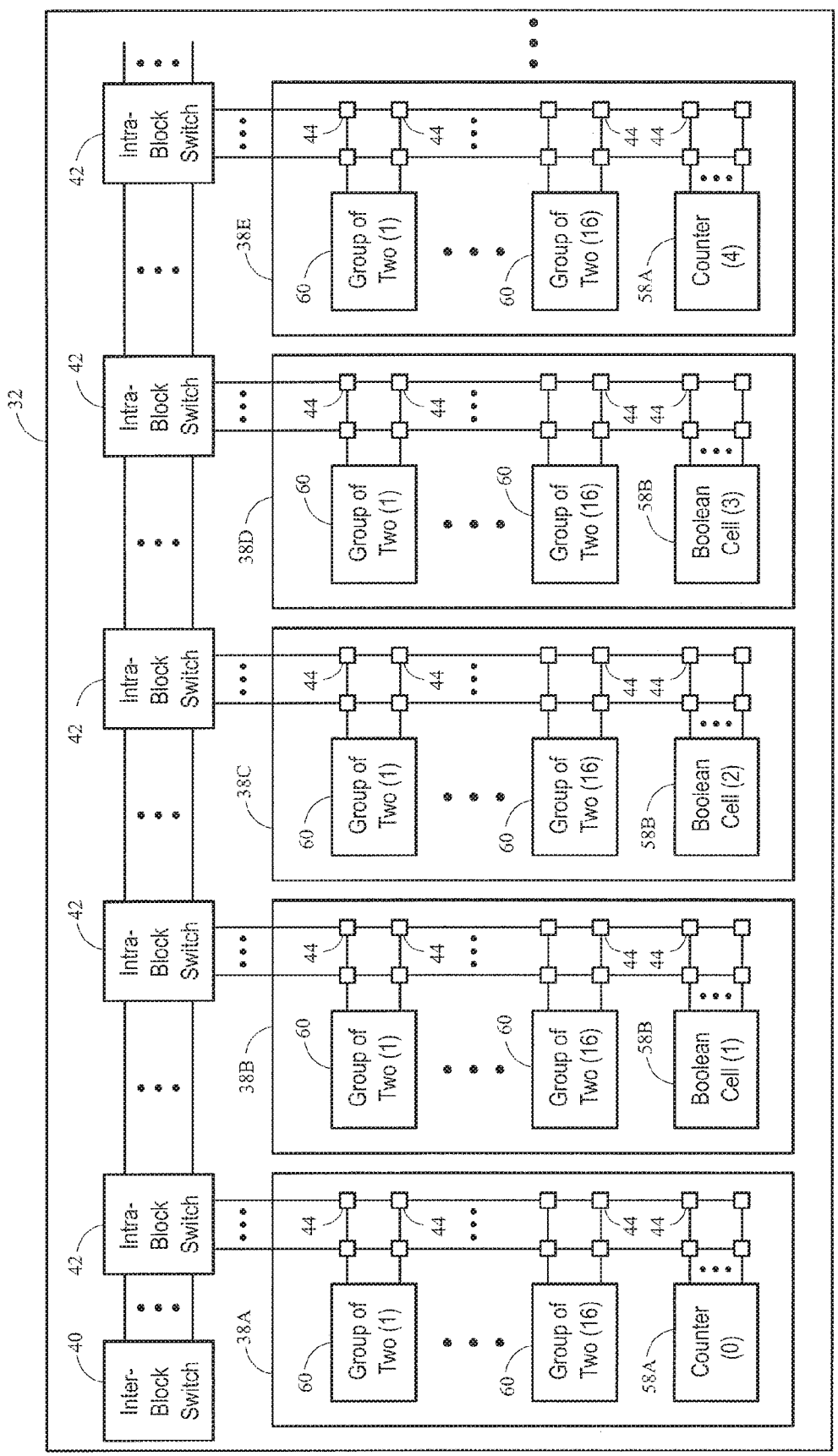
FIG. 4A illustrates a block as in FIG. 3 having counters in rows of the block, according to various embodiments of the invention.

FIG. 4A is an illustration of an example of a block 32 having rows 38 which each include the special purpose element 58. For example, the special purpose elements 58 in the block 32 may include counter cells 58A and Boolean logic cells 58B. While only the rows 38 in row positions 0 through 4 are illustrated in FIG. 4A (e.g., labeled 38A through 38E), each block 32 may have any number of rows 38 (e.g., 16 rows 38), and one or more special purpose elements 58 may be configured in each of the rows 38. For example, in one embodiment, counter cells 58A may be configured in certain rows 38 (e.g., in row positions 0, 4, 8, and 12), while the Boolean logic cells 58B may be configured in the remaining of the 16 rows 38 (e.g., in row positions 1, 2, 3, 5, 6, 7, 9, 10, 11, 13, 14, 15, and 16). The GOT 60 and the special purpose elements 58 may be selectively coupled (e.g., selectively connected) in each row 38 through intra-row switching elements 44, where each row 38 of the block 32 may be selectively coupled with any of the other rows 38 of the block 32 through intra-block switching elements 42.

In some embodiments, each active GOT 60 in each row 38 may output a signal indicating whether one or more conditions are detected (e.g., a search result is detected), and the special purpose element 58 in the row 38 may receive the GOT 60 output to determine whether certain quantifiers of the one or more conditions are met and/or count a number of times a condition is detected. For example, quantifiers of a count operation may include determining whether a condition was detected at least a certain number of times, determining whether a condition was detected no more than a certain number of times, determining whether a condition was detected exactly a certain number of times, and determining whether a condition was detected within a certain range of times.

Outputs from the counter 58A and/or the Boolean logic cell 58B may be communicated through the intra-row switching elements 44 and the intra-block switching elements 42 to perform counting or logic with greater complexity. For example, counters 58A may be configured to implement the quantifiers, such as asserting an output only when a condition is detected an exact number of times. Counters 58A in a block 32 may also be used concurrently, thereby increasing the total bit count of the combined counters to count higher numbers of a detected condition. Furthermore, in some embodiments, different special purpose elements 58 such as counters 58A and Boolean logic cells 58B may be used together. For example, an output of one or more Boolean logic cells 58B may be counted by one or more counters 58A in a block 32.

Figure 5:
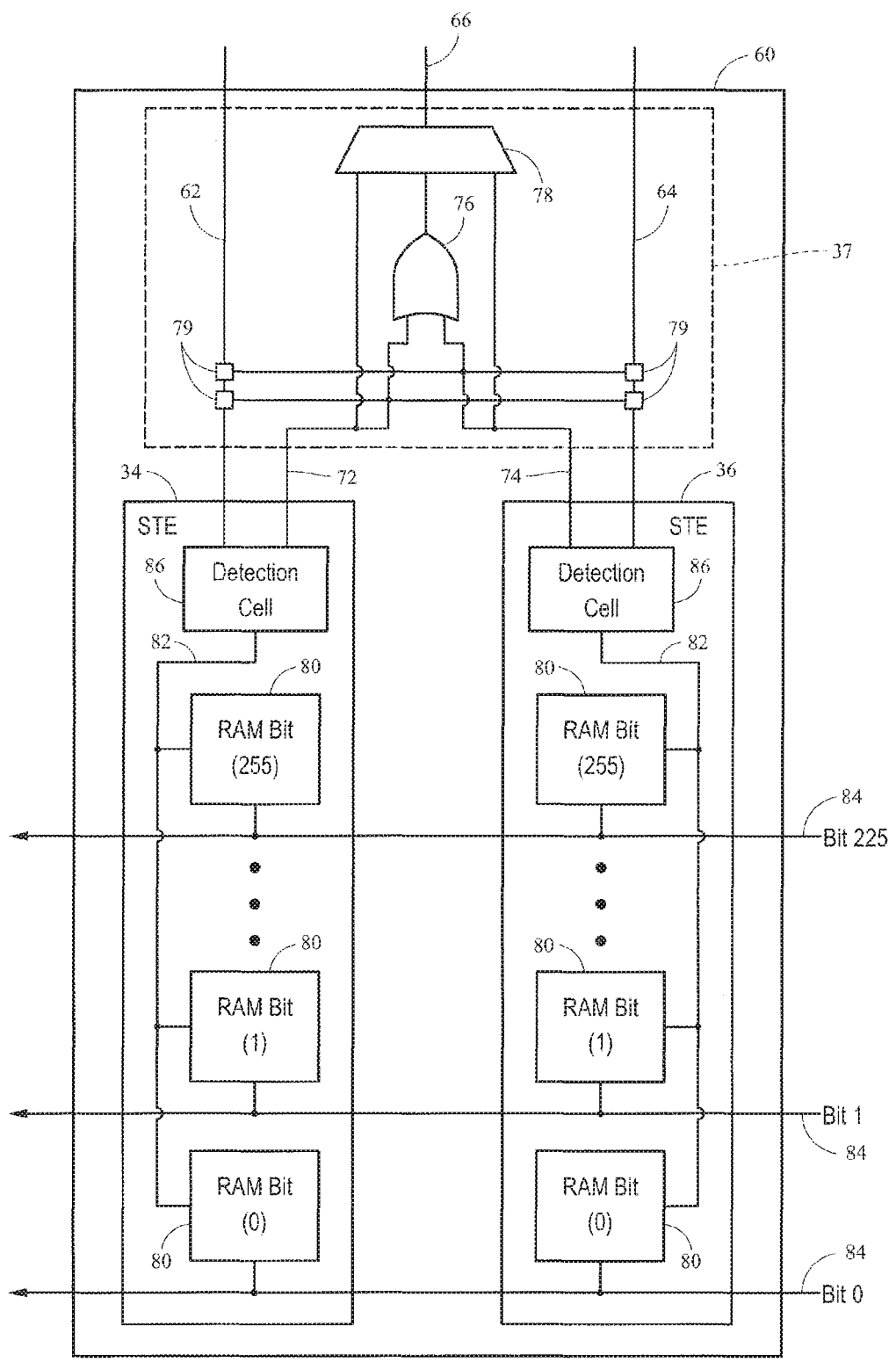
FIG. 5 illustrates an example of a Group of Two of the row of FIG. 4, according to embodiments.

FIG. 5 illustrates an example of a GOT 60. The GOT 60 includes a first STE 34 and a second STE 36 coupled to intra-group circuitry 37. For example, the first STE 34 and a second STE 36 may have inputs 62, 64 and outputs 72, 74 coupled to an OR gate 76 and a 3-to-1 multiplexer 78 of the intra-group circuitry 37. The 3-to-1 multiplexer 78 can be set to couple the output 66 of the GOT 60 to either the first STE 34, the second STE 36, or the OR gate 76. The OR gate 76 can be used to couple together both outputs 72, 74 to form the common output 66 of the GOT 60. In an example, the first and second STE 34, 36 exhibit parity, as discussed above, where the input 62 of the first STE 34 can be coupled to some of the row interconnection conductors 68 and the input 64 of the second STE 36 can be coupled to other row interconnection conductors 70 the common output 66 may be produced which may overcome parity problems. In an example, the two STEs 34, 36 within a GOT 60 can be cascaded and/or looped back to themselves by setting either or both of switching elements 79. The STEs 34, 36 can be cascaded by coupling the output 72, 74 of the STEs 34, 36 to the input 62, 64 of the other STE 34, 36. The STEs 34, 36 can be looped back to themselves by coupling the output 72, 74 to their own input 62, 64. Accordingly, the output 72 of the first STE 34 can be coupled to neither, one, or both of the input 62 of the first STE 34 and the input 64 of the second STE 36. Additionally, as each of the inputs 62, 64 may be coupled to a plurality of row routing lines, an OR gate may be utilized to select any of the inputs from these row routing lines along inputs 62, 64, as well as the outputs 72, 74.

In an example, each STE 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective STE 34, 36. When in the active state, the detection cell 86 outputs a low signal on the respective output line 72, 74 when the signals from all of the memory cells 82 of the respective STE 34, 36 are low.

In an example, an STE 34, 36 includes 256 memory cells 80 and each memory cell 80 is coupled to a different data stream line 84. Thus, an STE 34, 36 can be programmed to output a high signal when a selected one or more of the data stream lines 84 have a high signal thereon. For example, the STE 34 can have a first memory cell 80 (e.g., bit 0) set high and all other memory cells 80 (e.g., bits 1-255) set low. When the respective detection cell 86 is in the active state, the STE 34 outputs a high signal on the output 72 when the data stream line 84 corresponding to bit 0 has a high signal thereon. In other examples, the STE 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the STEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the STEs 34, 36. For example, a first STE 34 can be set to an active state by setting the detection cell 86 to the active state. The first STE 34 can be set to output a high signal when the data stream line 84 corresponding to bit 0 has a high signal thereon. The second STE 36 can be initially set to an inactive state, but can be set to, when active, output a high signal when the data stream line 84 corresponding to bit 1 has a high signal thereon. The first STE 34 and the second STE 36 can be cascaded by setting the output 72 of the first STE 34 to couple to the input 64 of the second STE 36. Thus, when a high signal is sensed on the data stream line 84 corresponding to bit 0, the first STE 34 outputs a high signal on the output 72 and sets the detection cell 86 of the second STE 36 to an active state. When a high signal is sensed on the data stream line 84 corresponding to bit 1, the second STE 36 outputs a high signal on the output 74 to activate another STE 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a search result of a given pattern, a word comprising a plurality of bits indicating search results and non-search results to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

Figure 6:
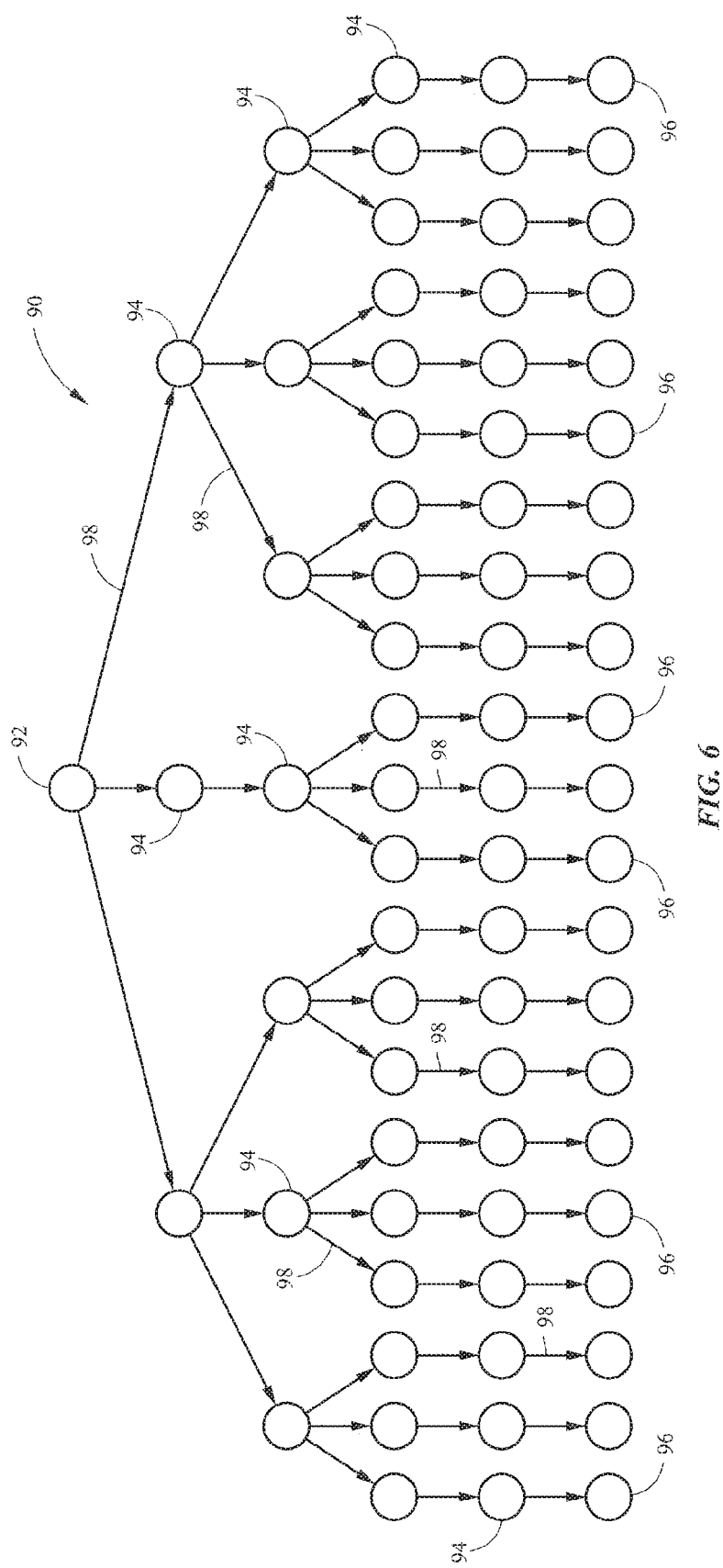
FIG. 6 illustrates an example of a finite state machine graph, according to various embodiments.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a search result of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a search result to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past search results. For example, the one or more patterns of input data required to reach a terminal node 96 can be represented by the activation of that terminal node 96. In an example, the output provided by a terminal node 96 is binary, for example, the output indicates whether a search result for a pattern of interest has been generated or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
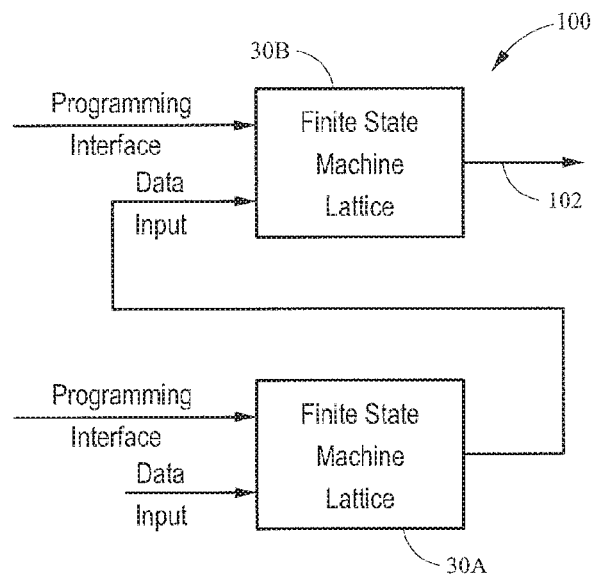
FIG. 7 illustrates an example of two-level hierarchy implemented with FSM lattices, according to various embodiments.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past search results in a compressed word from a first FSM lattice 30A to a second FSM lattice 30B. The data provided can effectively be a summary of complex matches (e.g., sequences of interest) that were recorded by the first FSM lattice 30A.

Figure 7A:
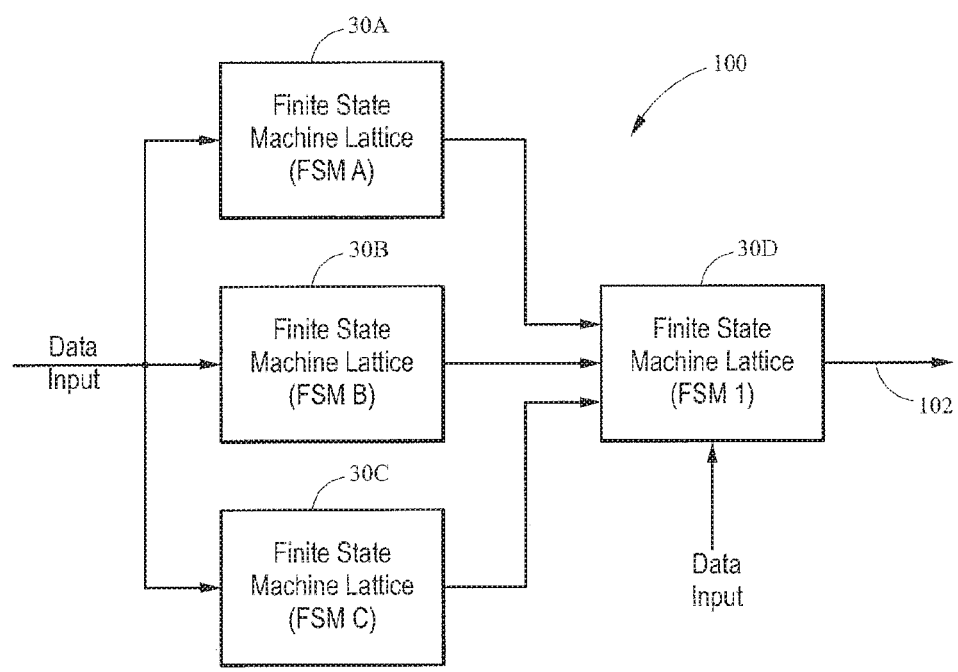
FIG. 7A illustrates a second example of two-level hierarchy implemented with FSM lattices, according to various embodiments.

FIG. 7A illustrates a second two-level hierarchy 100 of FSM lattices 30A, 30B, 30C, and 30D, which allows the overall FSM 100 (inclusive of all or some of FSM lattices 30A, 30B, 30C, and 30D) to perform two independent levels of analysis of the input data. The first level (e.g., FSM lattice 30A, FSM lattice 30B, and/or FSM lattice 30C) analyzes the same data stream, which includes data inputs to the overall FSM 100. The outputs of the first level (e.g., FSM lattice 30A, FSM lattice 30B, and/or FSM lattice 30C) become the inputs to the second level, (e.g., FSM lattice 30D). FSM lattice 30D performs further analysis of the combination the analysis already performed by the first level (e.g., FSM lattice 30A, FSM lattice 30B, and/or FSM lattice 30C). By connecting multiple FSM lattices 30A, 30B, and 30C together, increased knowledge about the data stream input may be obtained by FSM lattice 30D.

The first level of the hierarchy (implemented by one or more of FSM lattice 30A, FSM lattice 30B, and FSM lattice 30C) can, for example, perform processing directly on a raw data stream. For example, a raw data stream can be received at an input block 52 of the first level FSM lattices 30A, 30B, and/or 30C and the configurable elements of the first level FSM lattices 30A, 30B, and/or 30C can react to the raw data stream. The second level (implemented by the FSM lattice 30D) of the hierarchy can process the output from the first level. For example, the second level FSM lattice 30D receives the output from an output block 54 of the first level FSM lattices 30A, 30B, and/or 30C at an input block 52 of the second level FSM lattice 30D and the configurable elements of the second level FSM lattice 30D can react to the output of the first level FSM lattices 30A, 30B, and/or 30C. Accordingly, in this example, the second level FSM lattice 30D does not receive the raw data stream as an input, but rather receives the indications of search results for patterns of interest that are generated from the raw data stream as determined by one or more of the first level FSM lattices 30A, 30B, and/or 30C. Thus, the second level FSM lattice 30D can implement a FSM 100 that recognizes patterns in the output data stream from the one or more of the first level FSM lattices 30A, 30B, and/or 30C. However, it should also be appreciated that the second level FSM lattice 30D can additionally receive the raw data stream as an input, for example, in conjunction with the indications of search results for patterns of interest that are generated from the raw data stream as determined by one or more of the first level FSM lattices 30A, 30B, and/or 30C. It should be appreciated that the second level FSM lattice 30D may receive inputs from multiple other FSM lattices in addition to receiving output from the one or more of the first level FSM lattices 30A, 30B, and/or 30C. Likewise, the second level FSM lattice 30D may receive inputs from other devices. The second level FSM lattice 30D may combine these multiple inputs to produce outputs. Finally, while only two levels of FSM lattices 30A, 30B, 30C, and 30D are illustrated, it is envisioned that additional levels of FSM lattices may be stacked such that there are, for example, three, four, 10, 100, or more levels of FSM lattices.

Figure 8:
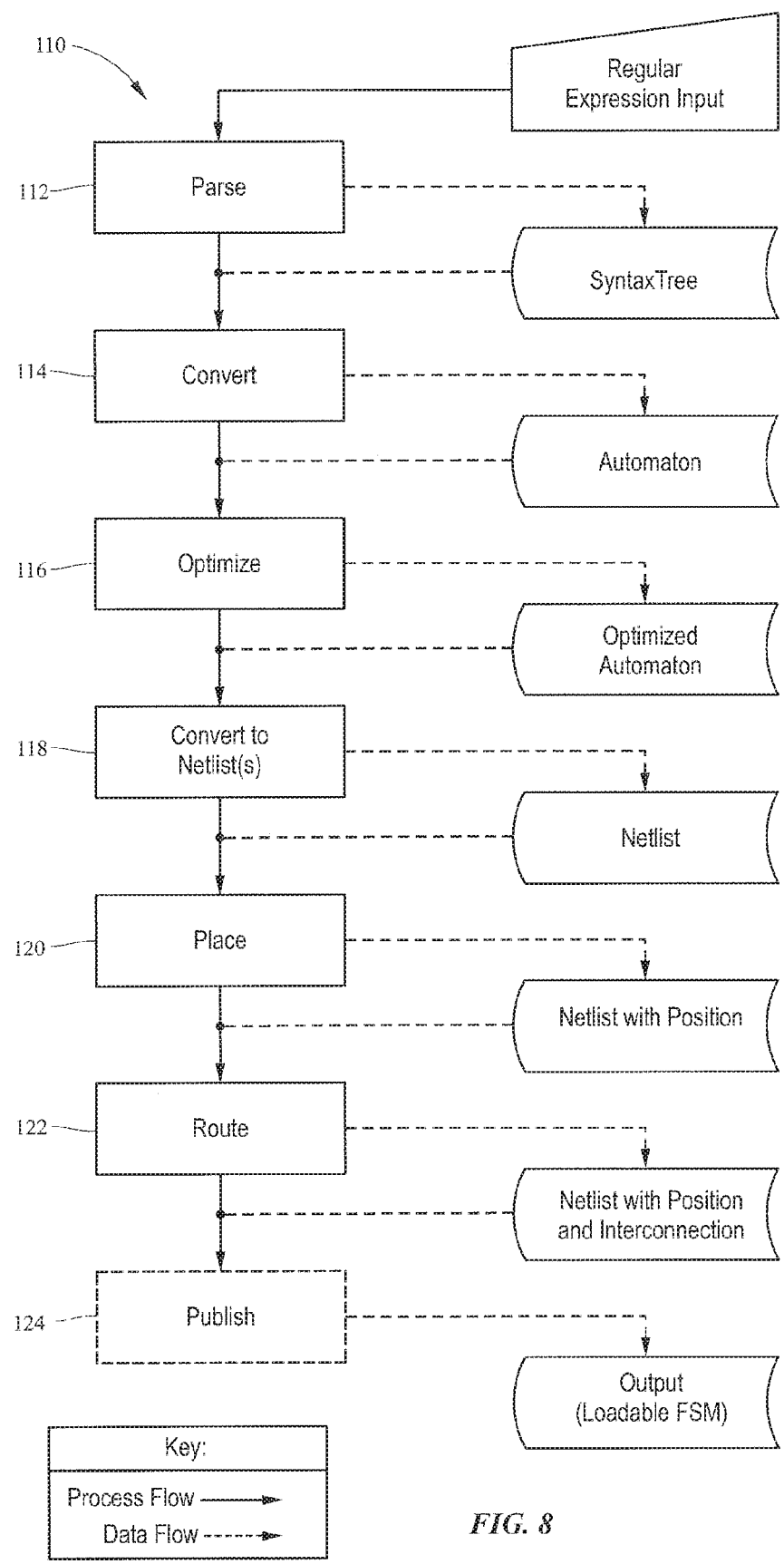
FIG. 8 illustrates an example of a method for a compiler to convert source code into a binary file for programming of the FSM lattice of FIG. 2, according to various embodiments.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexes in the source code in the form of a tree graph known as a syntax tree. The examples described herein refer to the arrangement as a syntax tree (also known as an "abstract syntax tree") in other examples, however, a concrete syntax tree as part of the abstract syntax tree, a concrete syntax tree in place of the abstract syntax tree, or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. For example, different operators can correspond to different functions implemented by the regexes in the source code.

At block 114, the syntax tree is converted into an automaton. An automaton comprises a software model of a FSM which may, for example, comprise a plurality of states. In order to convert the syntax tree into an automaton, the operators and relationships between the operators in the syntax tree are converted into states with transitions between the states. Moreover, in one embodiment, conversion of the automaton is accomplished based on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p, α), is shown by a directed connection from node p to node q. In an example, a reversal of an automaton produces a new automaton where each transition p→q on some symbol α is reversed q→p on the same symbol. In a reversal, start states become final states and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., STEs 34, 36, other elements) on the FSM lattice 30, and determines the connections between the hardware elements.

At block 120, the netlist is placed to select a specific hardware element of the target device (e.g., STEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements than can be accounted for via the placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of STEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the STEs 34, 36 and other hardware elements or by loading the image into one or more registers and then writing the bit values from the registers to the STEs 34, 36 and other hardware elements. In an example, the hardware elements (e.g., STEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
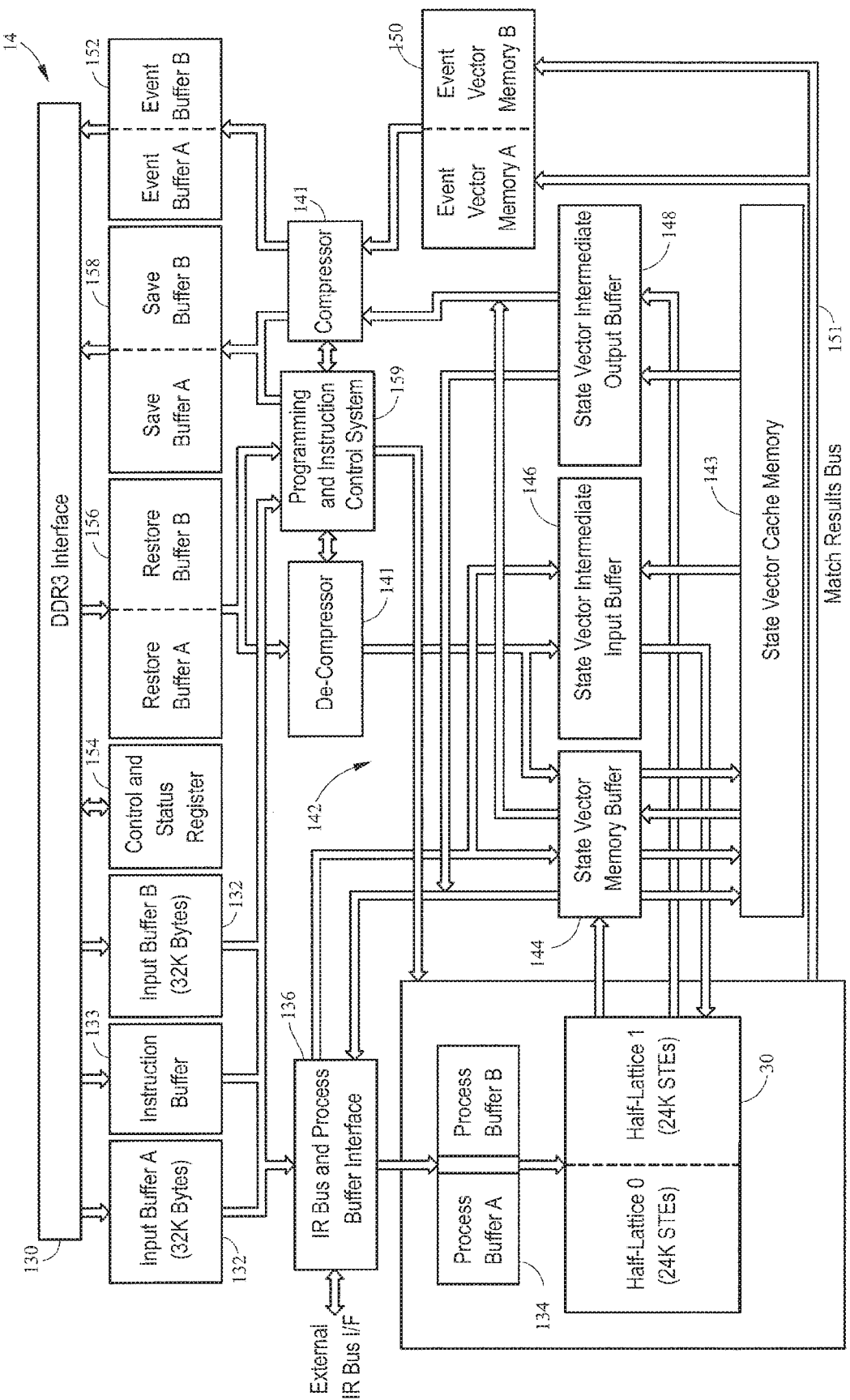
FIG. 9 illustrates a state machine engine, according to various embodiments.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving) data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMMI), etc. As previously described, the state machine engine 14 includes one or more FSM lattices 30 configured to analyze data. Each FSM lattice 30 may be divided into two half-lattices. In the illustrated embodiment, each half lattice may include 24K STEs (e.g., STEs 34, 36), such that the lattice 30 includes 48K STEs. The lattice 30 may comprise any desirable number of STEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes input buffers 132, an instruction buffer 133, process buffers 134, and an inter-rank (IR) bus and process buffer interface 136. The input buffers 132 are configured to receive and temporarily store data to be analyzed. In one embodiment, there are two input buffers 132 (input buffer A and input buffer B). Data may be stored in one of the two data input 132, while data is being emptied from the other input buffer 132, for analysis by the FSM lattice 30. The bus interface 130 may be configured to provide data to be analyzed to the input buffers 132 until the input buffers 132 are full. After the input buffers 132 are full, the bus interface 130 may be configured to be free to be used for other purpose (e.g., to provide other data from a data stream until the input buffers 132 are available to receive additional data to be analyzed). In the illustrated embodiment, the input buffers 132 may be 32 KBytes each. The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the analyzing of multiple data sets in parallel through a logical rank of FSM lattices 30. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include a 32 bit data bus. In other embodiments, the IR bus and process buffer interface 136 may include any suitable data bus, such as a 128 bit data bus.

In the illustrated embodiment, the state machine engine 14 also includes a de-compressor 138 and a compressor 140 to aid in providing state vector data through the state machine engine 14. The compressor 140 and de-compressor 138 work in conjunction such that the state vector data can be compressed to minimize the data providing times. By compressing the state vector data, the bus utilization time may be minimized. The compressor 140 and de-compressor 138 can also be configured to handle state vector data of varying burst lengths. By padding compressed state vector data and including an indicator as to when each compressed region ends, the compressor 140 may improve the overall processing speed through the state machine engine 14. The compressor 140 may be used to compress results data after analysis by the FSM lattice 30. The compressor 140 and de-compressor 138 may also be used to compress and decompress configuration data. In one embodiment, the compressor 140 and de-compressor 138 may be disabled (e.g., turned off) such that data flowing to and/or from the compressor 140 and de-compressor 138 is not modified.

As previously described, an output of the FSM lattice 30 can comprise a state vector. The state vector comprises the state (e.g., activated or not activated) of the STEs 34, 36 of the FSM lattice 30 and the dynamic (e.g., current) count of the counter 58. The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30 and to provide a state vector to the FSM lattice 30 to restore the FSM lattice 30 to a state corresponding to the provided state vector. For example, each state vector may be temporarily stored in the state vector cache memory 142. For example, the state of each STE 34, 36 may be stored, such that the state may be restored and used in further analysis at a later time, while freeing the STEs 34, 36 for further analysis of a new data set (e.g., search terms). Like a typical cache, the state vector cache memory 142 allows storage of state vectors for quick retrieval and use, here by the FSM lattice 30, for instance. In the illustrated embodiment, the state vector cache memory 142 may store up to 512 state vectors.

As will be appreciated, the state vector data may be exchanged between different state machine engines 14 (e.g., chips) in a rank. The state vector data may be exchanged between the different state machine engines 14 for various purposes such as: to synchronize the state of the STEs 34, 36 of the FSM lattices 30 of the state machine engines 14, to perform the same functions across multiple state machine engines 14, to reproduce results across multiple state machine engines 14, to cascade results across multiple state machine engines 14, to store a history of states of the STEs 34, 36 used to analyze data that is cascaded through multiple state machine engines 14, and so forth. Furthermore, it should be noted that within a state machine engine 14, the state vector data may be used to quickly configure the STEs 34, 36 of the FSM lattice 30. For example, the state vector data may be used to restore the state of the STEs 34, 36 to an initialized state (e.g., to prepare for a new input data set), or to restore the state of the STEs 34, 36 to prior state (e.g., to continue searching of an interrupted or "split" input data set). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency of the STEs 34, 36, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for configuring the FSM lattice 30. Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144. Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate rapid retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compressor 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is produced by the FSM lattice 30, an event vector may be stored in an event vector memory 150, whereby, for example, the event vector indicates at least one search result (e.g., detection of a pattern of interest). The event vector can then be sent to an event buffer 152 for transmission over the bus interface 130 to the processor 12, for example. As previously described, the results may be compressed. The event vector memory 150 may include two memory elements, memory element A and memory element B, each of which contains the results obtained by processing the input data in the corresponding input buffers 132 (e.g., input buffer A and input buffer B). In one embodiment, each of the memory elements may be DRAM memory elements or any other suitable storage devices. In some embodiments, the memory elements may operate as initial buffers to buffer the event vectors received from the FSM lattice 30, along results bus 151. For example, memory element A may receive event vectors, generated by processing the input data from input buffer A, along results bus 151 from the FSM lattice 30. Similarly, memory element B may receive event vectors, generated by processing the input data from input buffer B, along results bus 151 from the FSM lattice 30.

In one embodiment, the event vectors provided to the event vector memory 150 may indicate that a final result has been found by the FSM lattice 30. For example, the event vectors may indicate that an entire pattern has been detected. Alternatively, the event vectors provided to the event vector memory 150 may indicate, for example, that a particular state of the FSM lattice 30 has been reached. For example, the event vectors provided to the event vector memory 150 may indicate that one state (i.e., one portion of a pattern search) has been reached, so that a next state may be initiated. In this way, the event vector memory 150 may store a variety of types of results.

In some embodiments, IR bus and process buffer interface 136 may provide data to multiple FSM lattices 30 for analysis. This data may be time multiplexed. For example, if there are eight FSM lattices 30, data for each of the eight FSM lattices 30 may be provided to all of eight IR bus and process buffer interfaces 136 that correspond to the eight FSM lattices 30. Each of the eight IR bus and process buffer interfaces 136 may receive an entire data set to be analyzed. Each of the eight IR bus and process buffer interfaces 136 may then select portions of the entire data set relevant to the FSM lattice 30 associated with the respective IR bus and process buffer interface 136. This relevant data for each of the eight FSM lattices 30 may then be provided from the respective IR bus and process buffer interfaces 136 to the respective FSM lattice 30 associated therewith.

The event vector memory 150 may operate to correlate each received result with a data input that generated the result. To accomplish this, a respective result indicator may be stored corresponding to, and in some embodiments, in conjunction with, each event vector received from the results bus 151. In one embodiment, the result indicators may be a single bit flag. In another embodiment, the result indicators may be a multiple bit flag. If the result indicators may include a multiple bit flag, the bit positions of the flag may indicate, for example, a count of the position of the input data stream that corresponds to the event vector, the lattice that the event vectors correspond to, a position in set of event vectors, or other identifying information. These results indicators may include one or more bits that identify each particular event vector and allow for proper grouping and transmission of event vectors, for example, to compressor 140. Moreover, the ability to identify particular event vectors by their respective results indicators may allow for selective output of desired event vectors from the event vector memory 150. For example, only particular event vectors generated by the FSM lattice 30 may be selectively latched as an output. These result indicators may allow for proper grouping and provision of results, for example, to compressor 140. Moreover, the ability to identify particular event vectors by their respective result indicators allow for selective output of desired event vectors from the event vector memory 150. Thus, only particular event vectors provided by the FSM lattice 30 may be selectively provided to compressor 140.

Additional registers and buffers may be provided in the state machine engine 14, as well. In one embodiment, for example, a buffer may store information related to more than one process whereas a register may store information related to a single process. For instance, the state machine engine 14 may include control and status registers 154. In addition, a program buffer system (e.g., restore buffers 156) may be provided for initializing the FSM lattice 30. For example, initial (e.g., starting) state vector data may be provided from the program buffer system to the FSM lattice 30 (e.g., via the de-compressor 138). The de-compressor 138 may be used to decompress configuration data (e.g., state vector data, routing switch data, STE 34, 36 states, Boolean function data, counter data, match MUX data) provided to program the FSM lattice 30.

Similarly, a repair map buffer system (e.g., save buffers 158) may also be provided for storage of data (e.g., save maps) for setup and usage. The data stored by the repair map buffer system may include data that corresponds to repaired hardware elements, such as data identifying which STEs 34, 36 were repaired. The repair map buffer system may receive data via any suitable manner. For example, data may be provided from a "fuse map" memory, which provides the mapping of repairs done on a device during final manufacturing testing, to the save buffers 158. As another example, the repair map buffer system may include data used to modify (e.g., customize) a standard programming file so that the standard programming file may operate in a FSM lattice 30 with a repaired architecture (e.g., bad STEs 34, 36 in a FSM lattice 30 may be bypassed so they are not used). The compressor 140 may be used to compress data provided to the save buffers 158 from the fuse map memory. As illustrated, the bus interface 130 may be used to provide data to the restore buffers 156 and to provide data from the save buffers 158. As will be appreciated, the data provided to the restore buffers 156 and/or provided from the save buffers 158 may be compressed. In some embodiments, data is provided to the bus interface 130 and/or received from the bus interface 130 via a device external to the state machine engine 14 (e.g., the processor 12, the memory 16, the compiler 20, and so forth). The device external to the state machine engine 14 may be configured to receive data provided from the save buffers 158, to store the data, to analyze the data, to modify the data, and/or to provide new or modified data to the restore buffers 156.

The state machine engine 14 includes a lattice programming and instruction control system 159 used to configure (e.g., program) the FSM lattice 30 as well as provide inserted instructions, as will be described in greater detail below. As illustrated, the lattice programming and instruction control system 159 may receive data (e.g., configuration instructions) from the instruction buffer 133. Furthermore, the lattice programming and instruction control system 159 may receive data (e.g., configuration data) from the restore buffers 156. The lattice programming and instruction control system 159 may use the configuration instructions and the configuration data to configure the FSM lattice 30 (e.g., to configure routing switches, STEs 34, 36, Boolean cells, counters, match MUX) and may use the inserted instructions to correct errors during the operation of the state machine engine 14. The lattice programming and instruction control system 159 may also use the de-compressor 138 to de-compress data and the compressor 140 to compress data (e.g., for data exchanged with the restore buffers 156 and the save buffers 158).

The state machine engine 14 includes a lattice programming and instruction control system 159 used to configure (e.g., program) the FSM lattice 30 as well as provide inserted instructions, as will be described in greater detail below. As illustrated, the lattice programming and instruction control system 159 may receive data (e.g., configuration instructions) from the instruction buffer 133. Furthermore, the lattice programming and instruction control system 159 may receive data (e.g., configuration data) from the restore buffers 156. The lattice programming and instruction control system 159 may use the configuration instructions and the configuration data to configure the FSM lattice 30 (e.g., to configure routing switches, STEs 34, 36, Boolean cells, counters, match MUX) and may use the inserted instructions to correct errors during the operation of the state machine engine 14. The lattice programming and instruction control system 159 may also use the de-compressor 138 to de-compress data and the compressor 140 to compress data (e.g., for data exchanged with the restore buffers 156 and the save buffers 158).

In some embodiments, the state machine engine 14 may be utilized to solve particular classes of problems. One such class of problems includes a Boolean Satisfiability problem (SAT). The SAT may be viewed as determining whether there exists an interpretation that satisfies a given Boolean formula, e.g., whether the variables of a given Boolean formula can be consistently replaced by the values TRUE or FALSE in such a way that the formula evaluates to TRUE (e.g., determining if there is an assignment of true/false values to a given Boolean expression that will satisfy it). Two variations of solving the SAT utilizing the state machine engine 14 are set forth below. The variation includes determines if the expression (e.g., the Boolean formula) is satisfiable and, if so, discovering all possible solutions. The second variation includes determines only if the expression is satisfiable.

In some embodiments, the state machine engine 14 may configured (e.g., programmed) via the compiler 20 for each clause of an arbitrary conjunctive normal form (CNF) Boolean expression that itself represents the SAT. For example a given Boolean formula or problem to be solved may be a disjunction of literals (e.g., an AND of ORs) to be an arbitrary CNF Boolean expression. The input data to the state machine engine 14 (e.g., provided to one or more FSM lattices 30 via respective input blocks 52) may be a concatenated sequence of all possible permutations of the variables in the expression (e.g., the given Boolean formula). One or more STEs 34, 36 of the one or more FSM lattices 30 of the state machine engine 14 may be programmed to correspond to a single Boolean clause from the expression and generate a report (e.g., output a signal indicating whether one or more conditions of the clause are detected) when the respective clause is satisfied, that is, when any one of its variables is matches the input data, thus generating an event to be reported. In this manner, all clauses in the expression are evaluated and a solution of whether the CNF Boolean expression is satisfiable (i.e., whether the CNF Boolean expression can be solved) may be determined with a single pass of the data.

Examples of automatons (e.g., automata networks that may be implemented as part of the state machine engine 14 and, more particularly, the FSM lattice 30) that are believed to be particularly useful in solving a SAT are now presented. For example, the automaton (e.g., one or more particular STEs 34, 36) corresponding to a Boolean clause may recognize a "1" byte as true and a "0" byte as false. Moreover, an expression need not contain all variables and, accordingly, a "*" may represent a "don't care" byte (e.g., a byte that may be either true or false).

Figure 10:
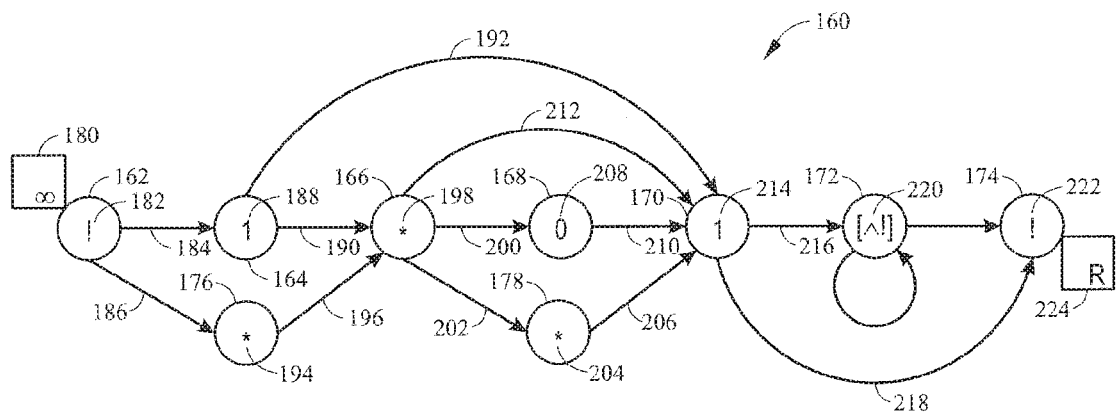
FIG. 10 illustrates a first embodiment of a graphical automaton representation for reporting of one or more events generated in the automaton.

As previously discussed, a Boolean formula or problem to be solved may be a disjunction of literals (e.g., an AND of ORs) to be an arbitrary CNF Boolean expression, and the state machine engine 14 may configured (e.g., programmed) via the compiler 20 for each clause of an arbitrary CNF Boolean expression. For example, a CNF Boolean expression may be $(A \lor \neg C \lor D) \land (A \lor \neg B \lor C) \land (A \lor C \lor D) \ldots \land (\neg A \lor \neg B \lor D)$, whereby A, B, C, and D are the variable set values that may be assigned true/false values in such a way that the CNF Boolean expression evaluates to TRUE, $\neg$ represents a negation (e.g. a logical complement or not that is interpreted as true when the corresponding variable to the negation is false and is interpreted as false with the corresponding variable to the negation is true), $\lor$ represents an logical inclusive disjunction (e.g., an OR), and $\land$ represents a logical conjunction (e.g., and AND). For the first Boolean clause $(A \lor \neg C \lor D)$, a series of STEs 34, 36 may be utilized to encode the input as 1*01. A corresponding example of one such automaton (e.g., a series of STEs 34, 36) that may be used to analyze the Boolean clause $(A \lor \neg C \lor D)$ is illustrated in FIG. 10, which is represented in the form of a graph 160 that may be generated in conjunction with, for example, the Micron Automata Processor Workbench tool. However, it should be noted that to solve the CNF Boolean expression, an additional automaton for each Boolean clause in the CNF Boolean expression would be additionally generated and all of the automatons could process an input data stream concurrently to solve the CNF Boolean expression.

As illustrated, the graph 160 of FIG. 10 may include STE symbols 162, 164, 166, 168, 170, 172, 174, 176, and 178 that may each represent a single STE (e.g., one of a respective STE 34, 36) that may be interconnected to analyze an input data stream for Boolean clause (A∨⌐C∨D) and report any results (e.g., when the input data of the input data stream matches the setting of the respective STE 34, 36, thus generating an event to be reported). It may be understood that the operation of graph 160 as discussed below may be representative of the operation and interconnectivity of the underlying respective STEs that correspond to STE symbols 162, 164, 166, 168, 170, 172, 174, 176, and 178. As illustrated, STE symbol 162 may include a start indicator 180 (e.g., "∞" as an all-input attribute) that indicates that the STE represented by STE symbol 162 is active on all input symbol cycles. STE symbol 162 includes a symbol set 182 of "!", whereby the symbol set 182 is a programmed symbol set of the STE represented by STE symbol 162 to be compared against a current input symbol (e.g., the input data) of the input data stream. An active STE 34, 36 will respond to the current input symbol and if the input symbol matches the programmed symbol set of the STE 34, 36, the STE 34, 36 will generate an output (e.g., an activate-on-match that activates any STEs 34, 36 to which it is connected, possibly including itself or a report-on-match to generate a report of the event).

The illustrated graph 160 in FIG. 10 may represent an analysis of an input data stream for the variable set values A, B, C, and D, for example, that may be provided as: !0000!0001!0010!0011! . . . !1001! . . . !1101!1110!1111!. That is, all possible combinations of 0 and 1 may be applied to each of the variable set values A, B, C, and D and each set of combinations of variable assignments may be separated by the symbol "!". Thus, the "!" may be the first input symbol transmitted and the STE represented by STE symbol 162 may compare the "!" as the current input symbol against the "!" of symbol set 182. As the "!" as the current input symbol matches the "!" of symbol set 182, thus generating an event, the STE represented by symbol 162 may activate the respective STEs represented by STE symbols 164 and 176 as an activate-on-match response. The transitions 184, 186 emanating from STE symbol 162 indicate the nodes (e.g., STE symbols 164 and 176 and their underlying STEs) that will be activated for processing the next character, if the source STE (e.g., STE represented by STE symbol 162) matches the current input symbol with the symbol set of the source STE (e.g., symbol set 182) against a current input symbol (e.g., the input data) of the input data stream.

The STE represented by STE symbol 164 may correspond to the set value A in the Boolean clause (A∨⌐C∨D) and, accordingly, may have a "1" as a symbol set 182. STE symbol 164 may be coupled to STE symbol 166 and STE symbol 172 via two respective transitions 190, 192. The connected STEs (represented by STE symbol 166 and STE symbol 172) are activated when the input data (e.g., current input symbol) to the STE represented by STE symbol 164 matches the symbol set (represented by "1" of symbol set 188) of the STE represented by STE symbol 164, which may be termed an event. Transition 190 illustrates activation of a STE represented by STE symbol 166 that may correspond to the set value B in the Boolean clause (A∨⌐C∨D). Likewise, transition 192 illustrates activation of a STE represented by STE symbol 172 so that the event may be reported, which will be discussed in greater detail below.

An alternate path, along transition 186, leads to a STE represented by STE symbol 176. STE symbol 176 includes an "*" as symbol set 194, whereby the "*" symbol indicates a match-any-character designation for the STE represented by STE symbol 176 such that any input data (e.g., current input symbol) to the STE represented by STE symbol 176 operates as a match to the symbol set of the STE represented by STE symbol 176 as an event. Transition 196 illustrates activation of a STE represented by STE symbol 166 as a result of the event.

The STE represented by STE symbol 166 may correspond to the set value B in the Boolean clause (A∨⌐C∨D) and, accordingly, may have an "*" as a symbol set 198, since the set value B in the Boolean clause (A∨⌐C∨D) is not present. STE symbol 166 may be coupled to STE symbol 168 and STE symbol 178 via two respective transitions 200, 202. The connected STEs (represented by STE symbol 168 and STE symbol 178) are activated when the input data (e.g., current input symbol) to the STE represented by STE symbol 164 matches the symbol set (represented by "*" of symbol set 198) of the STE represented by STE symbol 166, termed an event. In this case, all input data will generate an event and, thus, the connected STEs (represented by STE symbol 168 and STE symbol 178) will be activated when any input data is received by the STE represented by STE symbol 166. Transition 200 illustrates activation of a STE represented by STE symbol 168 that may correspond to the set value C in the Boolean clause (A∨⌐C∨D). Likewise, transition 202 illustrates activation of an alternate path that leads to a STE represented by STE symbol 178. STE symbol 178 includes an "*" as symbol set 204, such that any input data (e.g., current input symbol) to the STE represented by STE symbol 204 operates as a match to the symbol set of the STE represented by STE symbol 204 as an event, causing activation of the STE represented by STE symbol 170, illustrated by transition 206.

The STE represented by STE symbol 168 may correspond to the set value C in the Boolean clause (A∨⌐C∨D) and, accordingly, may have a "0" as a symbol set 208. STE symbol 168 may be coupled to STE symbol 170 and STE symbol 172 via two respective transitions 210, 212. The connected STEs (represented by STE symbol 170 and STE symbol 172) are activated when the input data (e.g., current input symbol) to the STE represented by STE symbol 168 matches the symbol set (represented by "0" of symbol set 208) of the STE represented by STE symbol 168 to generate an event. Transition 210 illustrates activation of a STE represented by STE symbol 170 that may correspond to the set value D in the Boolean clause (A∨⌐C∨D). Likewise, transition 212 illustrates activation of a STE represented by STE symbol 172 for reporting of the event.

The STE represented by STE symbol 170 may correspond to the set value D in the Boolean clause (A∨⌐C∨D) and, accordingly, may have a "1" as a symbol set 214. STE symbol 170 may be coupled to STE symbol 172 and STE symbol 174 via two respective transitions 216, 218. The connected STEs (represented by STE symbol 172 and STE symbol 174) are activated when the input data (e.g., current input symbol) to the STE represented by STE symbol 170 matches the symbol set (represented by "1" of symbol set 214) of the STE represented by STE symbol 170 to generate an event. Transition 216 illustrates activation of a STE represented by STE symbol 172 and transition 218 illustrates activation of a STE represented by STE symbol 174 for reporting of the event.

After the STE represented by STE symbol 172 is activated by any of the STEs represented by STE symbols 164, 168, or 170, the STE represented by STE symbol 172 will continue to remain activated as long as the input symbol is not an "!" as indicated by the "A!" as symbol set 220 and by the repeating arrow into STE symbol 172. In this manner, the STE represented by STE symbol 172 operates as a latch until the "!" is received as an input, at which time the STE represented by STE symbol 174 (which has a "!" as a symbol set 222), will generate a report (indicated by report indicator 224) of one or more events that were generated as the respective portions of the input data stream satisfied the Boolean clause (A∨⌐C∨D). This process can be repeated for the entire input data stream so as to determine both if the Boolean clause (A∨⌐C∨D) is satisfiable and all variable assignments that satisfy the Boolean clause (A∨⌐C∨D).

Similar graphs to those represented in graph 160 can be implemented for the remaining Boolean clauses of the CNF Boolean expression and the process described above can similarly be undertaken for the graphs of the remaining Boolean clauses concurrently with graph 160 on the input data stream to determine the variable set values that may be assigned true/false values in such a way that the CNF Boolean expression evaluates to TRUE with a single pass of the input data stream. In this manner, a determination of whether the CNF Boolean expression is satisfiable (i.e., whether the CNF Boolean expression can be solved) may be determined with a single pass of the data and all possible solutions for solving the CNF Boolean expression are reported.

The size of the input data stream to be analyzed to determine if the CNF Boolean expression is satisfiable can lead to additional complexities. Because the size of the input data stream grows exponentially with the number of variables in the Boolean expression, a bit-packing technique of the input data stream may be utilized. This bit-packing may, for example, reduce the data size by a factor of 8.

The automaton (e.g., one or more particular STEs 34, 36) corresponding to a Boolean clause may recognize input data (e.g., a current input symbol) as a single 8-bit character. The character may, for example, be specified in decimal or hexadecimal notation. The following discussion will utilize hexadecimal notations for these characters, which includes a leading "\x" followed by two hexadecimal digits. To reduce the size of the input data stream in evaluating a CNF Boolean expression, given that only recognition of "0" or "1" for each variable in a Boolean clause occurs, seven variables can be packed into the input data with an eighth bit reserved for a separator between clauses. Thus, for the previous example with variable set values of A, B, C, and D, the input data may be encoded as follows:
  Bit 0 [01] (value for A)
  Bit 1 [01] (value for B)
  Bit 2 [01] (value for C)
  Bit 3 [01] (value for D)
  Bit 4 [01] (don't care)
  Bit 5 [01] (don't care)
  Bit 6 [01] (don't care)
  Bit 7 [01] (don't care)

Thus, for each input data byte, each bit can be associated with a value of "0" or "1" (e.g., [01]) and because there are only four variable set values to be analyzed in the present example (e.g., A, B, C, D), the remaining bit values at bit 5, bit 6, and bit 7 of the input data byte can be ignored. Using the bit-packing technique, the symbol set recognized by each STE in the automaton will be recognized for all input symbol values where any of the bit positions of interest (in this example, bit values at bit 1, bit 2, bit 3, and bit 4 of the input data byte) are satisfied for the Boolean clause.

Continuing with the previous example of a Boolean clause (A∨⌐C∨D), the encoding for this particular clause would be:
  Bit 0: A=true=1
  Bit 1: B=don't care=[01]
  Bit 2: C=false=0
  Bit 3: D=true=1
  Bit 4: don't care=[01]
  Bit 5: don't care=[01]
  Bit 6: don't care=[01]
  Bit 7: don't care=[01]

Thus, for all input data having bit 0="1" or bit 2="0" or bit 3="1" present, the Boolean clause is satisfied and an event should be reported. Therefore, for the present example, variable set value A (bit 0) is "1" for all odd numbers, variable set value C (bit 2) is "0" for the set of numbers including (0, 1, 2, 3, 8, 9, 10, 11, 16, . . . ), and variable set value D (bit 3) is "1" for the set of numbers including (8, 9, 10, 11, 12, 13, 14, 15, 24, . . . ). Thus, a STE symbol set may be represented as the union of the above three sets, e.g., (0-3, 5, 7-16, . . . ), which may be represented as characters in hexadecimal as (\x00-\x03, \x05, \x07-\x10, . . . ). Additionally, a separation character (e.g., a "\x80" symbol) may be used to separate input permutations, such that the input data stream may be encoded as: (\x80 \x00 \x80 \x01 \x80 \x02 \x80 . . . ). Furthermore, it should be noted that if more than seven variables are desired, the input data may be transmitted across multiple consecutive bytes. For example, up to 15 variables may be transmitted across two consecutive bytes with the sixteenth location of the consecutive bytes being reserved for a separator character. Likewise, up to 23 variables may be transmitted across three consecutive bytes with the twenty fourth location of the consecutive bytes being reserved for a separator character and so forth for a desired number of variables.

Figure 11:
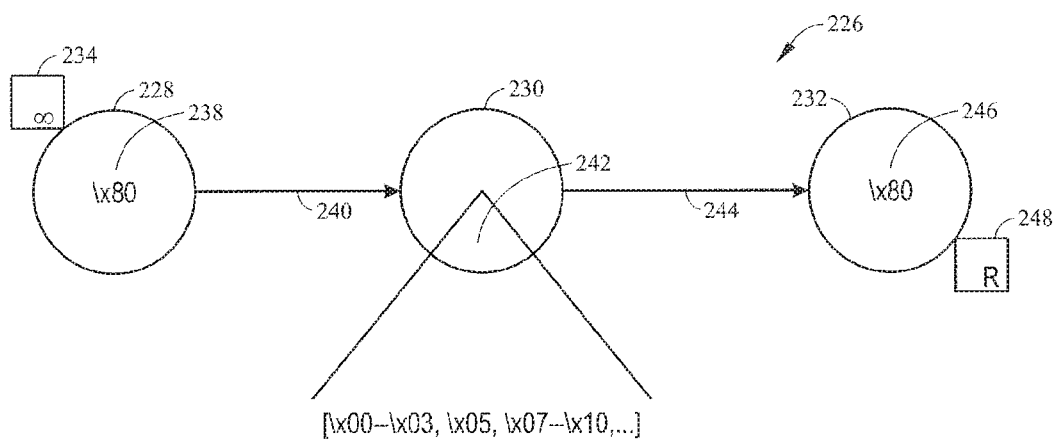
FIG. 11 illustrates a second embodiment of a graphical automaton representation for reporting of one or more events generated in the automaton.

FIG. 11 illustrates an example of a graph 226 of an automaton that may include STE symbols 228, 230, and 232 that may each represent an STE (e.g., respective STEs 34, 36) that may be interconnected to analyze an input data stream for Boolean clause (A∨⌐C∨D) of a CNF Boolean expression and report any results (e.g., when the input data of the input data stream matches the setting of the STE 34, 36, thus generating an event to be reported). It may be understood that the operation of graph 226 as discussed below may be representative of the operation and interconnectivity of the underlying respective STEs that correspond to STE symbols 228, 230, and 232. As illustrated, STE symbol 228 may include a start indicator 234 (e.g., "∞" as an all-input attribute) that indicates that the STE represented by STE symbol 228 is active on all symbol cycles. STE symbol 228 includes a symbol set 238 of "\x80", whereby the symbol set 238 is a programmed symbol set of the STE represented by STE symbol 228 to be compared against a current input symbol (e.g., the input data) of the input data stream.

The illustrated graph 226 in FIG. 11 may represent an analysis of an input data stream for the variable set values A, B, C, and D, for example, that may be provided as: (\x80 \x00 \x80 \x01 \x80 \x02 \x80 . . . ). Thus, the "\x80" may be the first input symbol transmitted and the STE represented by STE symbol 228 may compare the "\x80" as the current input symbol against the "\x80" of symbol set 238. As the "\x80" as the current input symbol matches the "\x80" of symbol set 238, thus generating an event, the STE represented by symbol 228 may activate the respective STE represented by STE symbol 230 as an activate-on-match response. The transition 240 emanating from STE symbol 228 indicates the node (e.g., STE symbol 230 and its underlying STE) that will be activated for processing the next character, if the source STE (e.g., STE represented by STE symbol 228) matches the current input symbol with the symbol set of the source STE (e.g., symbol set 238).

The STE represented by STE symbol 230 may have a symbol set that corresponds to the union of the sets of values that solves each of variable set value A as "1" or variable set value C as "0" or variable set value D as "1" as symbol set 242. Symbol set 242 may represent a clause variable encoding for the automaton represented by graph 226 and may match the bit-packed input data against the symbol set of the STE represented by STE symbol 230. STE symbol 230 may be coupled to STE symbol 232 via transition 244. The connected STE (represented by STE symbol 244) is activated when the input data (e.g., current input symbol) to the STE represented by STE symbol 230 matches any portion of the symbol set 242, which may be termed an event. Transition 244 illustrates activation of a STE represented by STE symbol 232, which includes a "\x80" as symbol set 246.

After the STE represented by STE symbol 232 is activated, the STE represented by STE symbol 232 compares compare the current input symbol against the "\x80" of symbol set 246. If an "\x80" is received as the current input symbol, the STE represented by STE symbol 232 (which has an "\x80" as a symbol set 246), will generate a report (indicated by report indicator 248) of the event that was generated as a respective portion of the input data stream satisfied the Boolean clause (A∨⌐C∨D).

The automaton represented in graph 226 generates a report indicating an event for all input data of the input data stream that satisfies the Boolean clause (A∨⌐C∨D). Additionally, the automaton represented in graph 226 can utilized in combined with additional automatons programmed in a manner similar to that set forth in graph 226 to analyze additional Boolean clauses of a CNF Boolean expression to determine whether the CNF Boolean expression is satisfiable while discovering all possible solutions. However, in some instances, reduction of the number of reports generated (e.g., reports of solutions to solve the Boolean clauses and/or the CNF Boolean expression) may be desirable. To reduce the number of reports generated (and, in turn, only determine if the CNF Boolean expression is satisfiable), an automaton with a pruning feature may be implemented.

Figure 12:
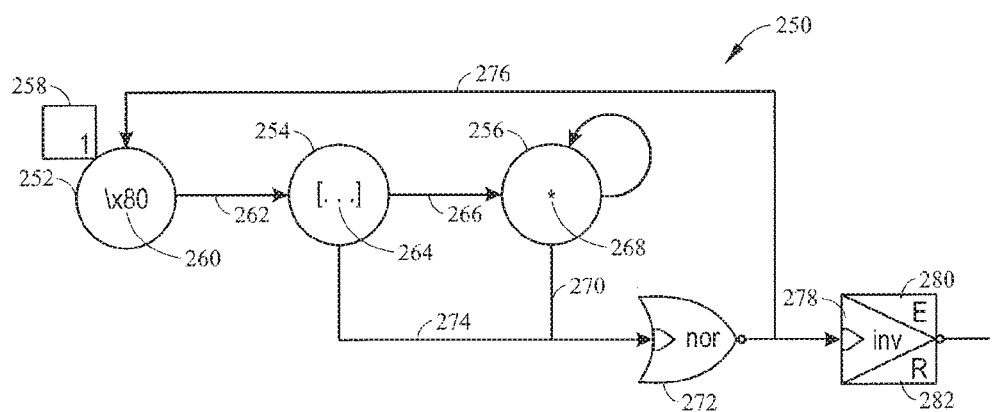
FIG. 12 illustrates a third embodiment of a graphical automaton representation for reporting of an event generated in the automaton.

FIG. 12 may represent an example of a graph 250 of an automaton that may include STE symbols 252, 254, and 256 that may each represent an STE (e.g., respective STEs 34, 36) that may be interconnected to analyze an input data stream for Boolean clause (A∨⌐C∨D) of a CNF Boolean expression and report and be pruned after being satisfied once. It may be understood that the operation of graph 250 as discussed below may be representative of the operation and interconnectivity of the underlying respective STEs that correspond to STE symbols 252, 254, and 256. As illustrated, STE symbol 252 may include a start indicator 258 (e.g., "1" as a start of data attribute) that indicates that the STE represented by STE symbol 252 is active on at the start of an input data stream. STE symbol 252 includes a symbol set 260 of "\x80", whereby the symbol set 260 is a programmed symbol set of the STE represented by STE symbol 252 to be compared against a current input symbol (e.g., the input data) of the input data stream.

The illustrated graph 250 in FIG. 12 may represent an analysis of an input data stream for the variable set values A, B, C, and D, for example, that may be provided as: (\x80 \x00 \x80 \x01 \x80 \x02 \x80 . . . ). Thus, the "\x80" may be the first input symbol transmitted and the STE represented by STE symbol 252 may compare the "\x80" as the current input symbol against the "\x80" of symbol set 260. As the "\x80" as the current input symbol matches the "\x80" of symbol set 260, thus generating an event, the STE represented by symbol 252 may activate the respective STE represented by STE symbol 254 as an activate-on-match response. The transition 262 emanating from STE symbol 252 indicates the node (e.g., STE symbol 254 and its underlying STE) that will be activated for processing the next character, if the source STE (e.g., STE represented by STE symbol 252) matches the current input symbol with the symbol set of the source STE (e.g., symbol set 260).

The STE represented by STE symbol 254 may have a symbol set that corresponds to the union of the sets of values that solves each of variable set value A as "1" or variable set value C as "0" or variable set value D as "1" as symbol set 264. Symbol set 264 may represent a clause variable encoding for the automaton represented by graph 250 and may match the bit-packed input data against the symbol set of the STE represented by STE symbol 254. For example, the STE symbol set 264 may be represented as a variable set value A (bit 0) being "1" for all odd numbers, variable set value C (bit 2) being "0" for the set of numbers including (0, 1, 2, 3, 8, 9, 10, 11, 16, . . . ), and variable set value D (bit 3) being "1" for the set of numbers including (8, 9, 10, 11, 12, 13, 14, 15, 24, . . . ). Thus, the union of the three sets, e.g., (0-3, 5, 7-16, . . . ), which may be represented as characters in hexadecimal as (\x00-\x03, \x05, \x07-\x10, . . . ), may be the clause variable encoding of the STE represented by STE symbol 254, represented by symbol set 264.

STE symbol 254 may be coupled to STE symbol 256 via transition 266. The connected STE (represented by STE symbol 256) is activated when the input data (e.g., current input symbol) to the STE represented by STE symbol 254 matches any portion of the symbol set 264, which may be termed an event. After the STE represented by STE symbol 256 is activated by the STE represented by STE symbol 254, the STE represented by STE symbol 256 will continue to remain activated as long as an input symbol is present, as indicated by the "*" match-any-character designation as symbol set 268 and will transmit an activation along transition 270 to NOR element 272 (e.g., interpreted by the NOR element as a logical "1").

STE symbol 254 may also be coupled to the NOR element 272 via transition 274. The NOR element 272 may operate as a single input activation element that performs the function that will be logically equivalent to an inverter and may be, for example, a Boolean cell 58a or a special purpose element 58. Until the STE symbol 254 is activated, transition 274 may transmit a logical "0" as the input to the NOR element 272. This in turn causes the NOR element 272 to transmit a logical "1" on transition 276 to activate the STE represented by STE symbol 252. This logical "1" is also transmitted to inverter element 278, which may be, for example, a separate Boolean cell 58a or special purpose element 58 from the NOR element 272.

The inverter 278 may include a start indicator 280 (e.g., "E" as a end of data attribute that activates the inverter when an end of data signal is received) and a report indicator 282 that will transmit a report if an event was registered in conjunction with the activation of the inverter when the end of data signal is received. However, the NOR element 272 also functions as a pruning element for the automaton represented in graph 250.

For example, input data inclusive of a separating character (e.g., "\x80") may be input into the automaton represented by graph 250. The STE represented by STE symbol 252 will generate an event in response to the input data "\x80" and will activate the STE represented by STE symbol 254. The next input data may be analyzed by the STE represented by STE symbol 254 in conjunction with symbol set 264. If no event is generated, transitions 266 and 274 remain deactivated, causing a logical "0" to be transmitted to NOR element 272. This, in turn, activates transition 276 to activate the STE represented by STE 252 for the next input data (e.g., "\x80") to begin the process anew. Additionally, the NOR element 272 will transmit its output (e.g., a logical "1") to inverter 278, which will invert this input to a logical "0" indicating that no event was generated and no report will be transmitted if an end of data signal is recognized by the inverter 278. If the process repeats in this manner, and no input data causes an event in the STE represented by STE 254, no report from the automaton related to the present Boolean clause will be generated e.g., for transmission to a host (e.g., processor 12). However, if an event does occur, the NOR element will function as a pruning element as discussed below.

Input data inclusive of a separating character (e.g., "\x80") may be input into the automaton represented by graph 250. The STE represented by STE symbol 252 will generate an event in response to the input data "\x80" and will activate the STE represented by STE symbol 254. The next input data may be analyzed by the STE represented by STE symbol 254 in conjunction with symbol set 264. As previously discussed, symbol set 264 may represent a clause variable encoding for the automaton represented by graph 250 and may match the bit-packed input data against the symbol set of the STE represented by STE symbol 254. When the input data (e.g., current input symbol) to the STE represented by STE symbol 254 matches any portion of the symbol set 264, an event has occurred, which activates the STE represented by STE symbol 256 through transition 266 and transmits a logical "1" to the NOR element 272 via transition 274. This causes the NOR element 272 to generate a logical 0, which operates to deactivate the STE represented by STE symbol 252 via transition 276. Additionally, this logical "0" is transmitted to inverter 278 (e.g., to be inverted by inverter 278 into a logical "1" which corresponds to value to be reported if an end of data signal is received).

The next input data will not be analyzed by the STE represented by STE symbol 252, since it has been deactivated by the NOR element 272. However, the next input data will be analyzed by the STE represented by 256 as a current input symbol, since the STE represented by STE symbol 256 was activated via transition 266. The next input data, regardless of its value, will cause an event to be generated in the STE represented by STE symbol 252 due to its "*" match-any-character designation as symbol set 268. This will cause an activation along transition 270 to NOR element 272 (e.g., interpreted by the NOR element as a logical "1"), maintaining the output of the NOR element 272 as a logical "0". Additionally, as the STE represented by STE symbol 256 is a latching STE, as indicated by the repeating arrow into STE symbol 256, the STE represented by STE symbol 256 will continue to remain activated as long as input data is present. In this manner, the STE represented by STE symbol 256 will continue to transmit an activation along transition 270 to NOR element 272 (e.g., interpreted by the NOR element as a logical "1") for each input data and the STE represented by STE symbol 254 will no longer be able to analyze any input data (since the STE represented by STE symbol 252 is deactivated and, thus, cannot activate the STE represented by STE symbol 254). Accordingly, the first event generated by the STE represented by STE symbol 254 will be reported by the inverter 278 when an end of data signal is received; however, the automaton represented by graph 250 precludes any additional events to be generated by the STE represented by STE symbol 254.

In this manner, the automaton represented in graph 250 may generate a report indicating an event that satisfies the Boolean clause (A\/¬C\/D) or, as discussed above, no report may be generated (indicating that the Boolean clause (A\/¬C\/D) was not satisfied). Additionally, the automaton represented in graph 250 can utilized in combined with additional automatons programmed in a manner similar to that set forth in graph 226 to analyze additional Boolean clauses of a CNF Boolean expression to determine whether the CNF Boolean expression is satisfiable. That is, similar automatons to that represented in graph 250 may be implemented to analyze the remaining Boolean clauses of the CNF Boolean expression and will similarly generate a report indicating an event that satisfies their respective Boolean clause or no report may be generated to indicate that their respective Boolean clause was not satisfied. All of the reports may be transmitted to the host (e.g., processor 12). The host (e.g. processor 12) can then determine whether the CNF Boolean expression is satisfiable by comparing the number of reports received to the number of Boolean clauses in the CNF Boolean expression. If the number of reports received are equivalent to the Boolean clauses in the CNF Boolean expression, then the CNF Boolean expression is satisfiable. If the number of reports received are not equivalent to the Boolean clauses in the CNF Boolean expression, then the CNF Boolean expression is not satisfiable. This allows for a determination of the satisfiability of a CNF Boolean expression with transmission and reception of a minimum amount of reports (e.g., not all reports of satisfaction of the Boolean clauses are transmitted, just a record of an occurrence of the Boolean clauses being satisfied), from which the host (e.g., processor 12) can determine whether the CNF Boolean expression is satisfiable.

Figure 13:
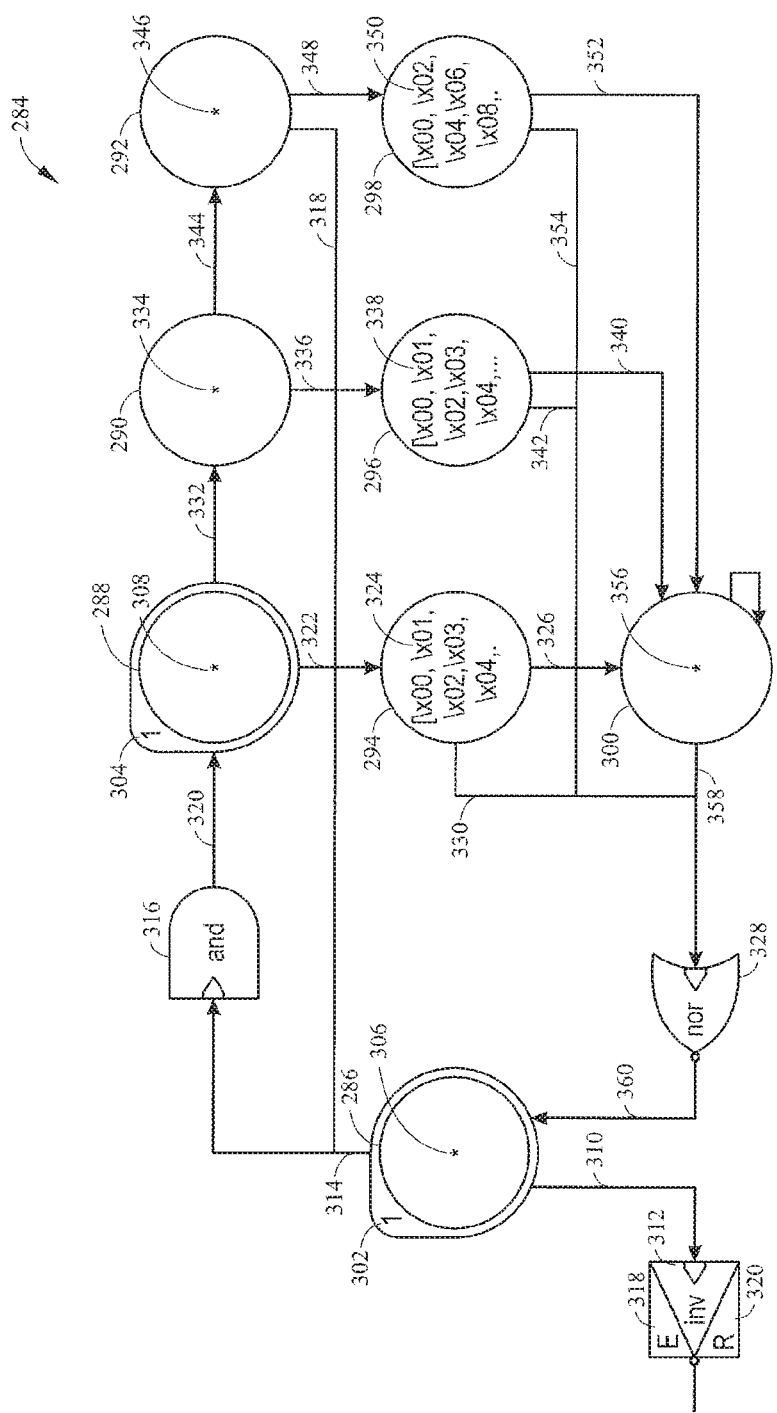
FIG. 13 illustrates a fourth embodiment of a graphical automaton representation for reporting of an event generated in the automaton.

In other embodiments, automatons may be used in combination to analyze Boolean clauses of a CNF Boolean expression to determine whether the CNF Boolean expression is satisfiable without the use of separating characters, such as "\x80" described above. In this manner, the size of the input data stream may be reduced, as no separating character is transmitted. The removal of the separating character may be undertaken since the host (e.g., processor 12) recognizes how many bytes are required to encode each permutation of variable assignments. As an additional benefit, the eighth bit of the input data may also be freed to use for encoding variables, in contrast to the examples provided above wherein seven variables can be packed into the input data with an eighth bit reserved for a separator between clauses, since the automatons may be configured to operate without the use of separating characters. FIG. 13 illustrates a graphical representation of an automaton that can be utilized with an input data stream absent of separating characters.

FIG. 13 may represent an example of a graph 284 of an automaton that may include STE symbols 286, 288, 290, 292, 294, 296, 298, and 300 that may each represent an STE (e.g., respective STEs 34, 36) that may be interconnected to analyze an input data stream for multiple Boolean clauses of a CNF Boolean expression, report, and be pruned after being satisfied once without the use of a separating character (e.g., "\x80" described above) between input characters. It may be understood that the operation of graph 284 as discussed below may be representative of the operation and interconnectivity of the underlying respective STEs that correspond to STE symbols 286, 288, 290, 292, 294, 296, 298, and 300. As illustrated, STE symbols 286 and 288 may each include a respective start indicator 302, 304 (e.g., "1" as a start of data attribute) that indicates that the STEs represented by STE symbols 286 and 288 are active on at the start of an input data stream. STE symbols 286 and 288 each include a respective symbol set 306 and 308 of "*" representative of a match-any-character designation as symbol sets 306 and 308, whereby the symbol sets 306 and 308 are programmed symbol sets of the STEs represented by STE symbols 286 and 288 to be compared against a current input symbol (e.g., the input data) of the input data stream.

The illustrated graph 284 in FIG. 13 may represent an analysis of an input data stream for the variable set values A, B, C, and D, for example, that may be provided as: (\x80 \x00 \x00 \x00 \x01 \x01 \x01 \x02 \x02 \x02 . . . ). In the example input data stream provided, the first input symbol is "\x80," but as this is merely a start of input data symbol for the illustrated graph 284, any symbol may be used in its place. In the present embodiment, "\x80" is the first input symbol transmitted and the STE represented by STE symbol 286 may compare the "\x80" as the current input symbol against the "*" of symbol set 306. As any input symbol as the current input symbol will match the "*" match-any-character designation of symbol set 306 (thus generating an event), the STE represented by symbol 286 will transmit an activation along transition 310 to the inverter 312 (e.g., interpreted by the inverter 312 as a logical "1") as well as an activation along transition 314 to the AND element 316 (e.g., interpreted by the AND element 316 as a logical "1") in response to the first input symbol of "\x80" that is received as the current input symbol.

As illustrated, the inverter 312 may include a start indicator 318 (e.g., "E" as an end of data attribute that activates the inverter when an end of data signal is received) and a report indicator 320 that will transmit a report if an event was registered in conjunction with the activation of the inverter when the end of data signal is received. Moreover, the value transmitted along transition 310 will be logically inverted by the inverter 312. Thus, in response to transition 310 being active (e.g., interpreted by the inverter 312 as a logical "1"), the inverter 312 inverts this received input to a logical "0" indicating that no event was generated and no report will be transmitted if an end of data signal is recognized by the inverter 312.

Additionally, the AND element 316 will receive the logical "1" generated by the STE represented by STE symbol 286 in response to the first input symbol of "\x80" that is received as the current input symbol as well as a logical "0" representing transition 318 being inactive (since the STE represented by STE symbol 292 is not active in response to the first input symbol of "\x80" being received). Thus, the output of AND element 316 in response to the first the first input symbol of "\x80" will be a logical "0," which corresponds to transition 320 being inactive in response to the first input symbol of "\x80" causing transition 314 to be active while transition 318 is inactive.

Likewise, the "\x80" as the first input symbol transmitted may be compared by the STE represented by STE symbol 288 as the current input symbol against the "*" of symbol set 308. As any input symbol as the current input symbol will match the "*" match-any-character designation of symbol set 308 (thus generating an event), the STE represented by symbol 288 will transmit an activation along transition 322 to the STE represented by STE symbol 294 as an activate-on-match response. The transition 322 emanating from STE symbol 288 indicates the node (e.g., STE symbol 294 and its underlying STE) that will be activated for processing the next character, if the source STE (e.g., STE represented by STE symbol 288) matches the current input symbol with the symbol set of the source STE (e.g., symbol set 308).

The STE represented by STE symbol 294 may have a symbol set that corresponds to a first union of sets of values that solve each of variable set values for A, B, C, and/or D as symbol set 324. Symbol set 324 may represent a first clause variable encoding for the automaton and, in the present embodiment, may be matched against certain portions of the bit-packed input data (e.g., the $2^{nd}$, $5^{th}$, $8^{th}$, . . . input symbol) as the clause variable encoding of the STE represented by STE symbol 294. When the input data (e.g., current input symbol) to the STE represented by STE symbol 294 matches any portion of the symbol set 324, an event has occurred, which causes the STE represented by STE symbol 294 to transmit an activation along transition 326 to the STE represented by STE symbol 300 as an activate-on-match response. This occurrence of an event also causes the STE represented by STE symbol 294 to transmits a logical "1" to the NOR element 328 via transition 330. However, when the input data (e.g., current input symbol) to the STE represented by STE symbol 294 does not match any portion of the symbol set 324, no event has occurred and transitions 326 and 330 remain deactivated, causing a logical "0" to be transmitted to NOR element 328 and not causing the activation of the STE represented by STE symbol 300 along transition 326. In this manner, the second input symbol (e.g., "\x00") of the input data stream is compared against the symbol set 324 of the STE represented by STE symbol 294.

Additionally, the "\x80" as the first input symbol transmitted may be compared by the STE represented by STE symbol 288 as the current input symbol against the "*" of symbol set 308, thus generating an event, and causing the STE represented by symbol 288 to transmit an activation along transition 332 to the STE represented by STE symbol 290 as an activate-on-match response. The transition 332 emanating from STE symbol 288 indicates the node (e.g., STE symbol 290 and its underlying STE) that will be activated for processing the next character, if the source STE (e.g., STE represented by STE symbol 288) matches the current input symbol with the symbol set of the source STE (e.g., symbol set 308). In this manner, the STE represented by STE symbol 290 is activated to compare the second input symbol (e.g., "\x00") of the input data stream as the current input symbol against its symbol set 334. As any input symbol as the current input symbol will match the "*" match-any-character designation of symbol set 334 (thus generating an event), the STE represented by symbol 334 will transmit an activation along transition 336 to the STE represented by STE symbol 296 as an activate-on-match response.

The STE represented by STE symbol 296 may have a symbol set that corresponds to a second union of sets of values that solve each of variable set values for A, B, C, and/or D as symbol set 338. Symbol set 338 may represent a second clause variable encoding for the automaton and, in the present embodiment, may be matched against certain portions of the bit-packed input data (e.g., the $3^{rd}$, $6^{th}$, $9^{th}$, . . . input symbol) as the clause variable encoding of the STE represented by STE symbol 296. When the input data (e.g., current input symbol) to the STE represented by STE symbol 296 matches any portion of the symbol set 338, an event has occurred, which causes the STE represented by STE symbol 296 to transmit an activation along transition 340 to the STE represented by STE symbol 300 as an activate-on-match response. This occurrence of an event also causes the STE represented by STE symbol 296 to transmit a logical "1" to the NOR element 328 via transition 342. However, when the input data (e.g., current input symbol) to the STE represented by STE symbol 296 does not match any portion of the symbol set 338, no event has occurred and transitions 340 and 342 remain deactivated, causing a logical "0" to be transmitted to NOR element 328 and not causing the activation of the STE represented by STE symbol 300 along transition 340. In this manner, the third input symbol (e.g., "\x00") of the input data stream is compared against the symbol set 338 of the STE represented by STE symbol 296.

Furthermore, the "\x00" as the second input symbol transmitted may be compared by the STE represented by STE symbol 290 as the current input symbol against the "*" of symbol set 334, thus generating an event, and causing the STE represented by symbol 290 to transmit an activation along transition 344 to the STE represented by STE symbol 292 as an activate-on-match response. The transition 344 emanating from STE symbol 290 indicates the node (e.g., STE symbol 292 and its underlying STE) that will be activated for processing the next character, if the source STE (e.g., STE represented by STE symbol 290) matches the current input symbol with the symbol set of the source STE (e.g., symbol set 334). In this manner, the STE represented by STE symbol 292 is activated to compare the third input symbol (e.g., "\x00") of the input data stream as the current input symbol against its symbol set 346. As any input symbol as the current input symbol will match the "*" match-any-character designation of symbol set 346 (thus generating an event), the STE represented by symbol 292 will transmit an activation along transition 348 to the STE represented by STE symbol 298 as an activate-on-match response.

The STE represented by STE symbol 298 may have a symbol set that corresponds to a third union of sets of values that solve each of variable set values for A, B, C, and/or D as symbol set 350. Symbol set 350 may represent a third clause variable encoding for the automaton and, in the present embodiment, may be matched against certain portions of the bit-packed input data (e.g., the $4^{th}$, $7^{th}$, $10^{th}$, . . . input symbol) as the clause variable encoding of the STE represented by STE symbol 298. When the input data (e.g., current input symbol) to the STE represented by STE symbol 298 matches any portion of the symbol set 350, an event has occurred, which causes the STE represented by STE symbol 298 to transmit an activation along transition 353 to the STE represented by STE symbol 300 as an activate-on-match response. This occurrence of an event also causes the STE represented by STE symbol 298 to transmit a logical "1" to the NOR element 328 via transition 354. However, when the input data (e.g., current input symbol) to the STE represented by STE symbol 298 does not match any portion of the symbol set 350, no event has occurred and transitions 352 and 354 remain deactivated, causing a logical "0" to be transmitted to NOR element 328 and not causing the activation of the STE represented by STE symbol 300 along transition 352. In this manner, the third input symbol (e.g., "\x00") of the input data stream is compared against the symbol set 350 of the STE represented by STE symbol 298.

Furthermore, the "\x00" as the third input symbol transmitted may be compared by the STE represented by STE symbol 292 as the current input symbol against the "*" of symbol set 346, thus generating an event, and causing the STE represented by symbol 292 to transmit an activation along transition 318 to the AND element 316. Additionally, as previously discussed, the AND element 316 will also receive the output of the STE represented by STE symbol 286 and the AND element 316 will generate an output in response to the logical values corresponding to the transitions 314 and 318. Additionally, if the STE represented by STE symbol 300 is activated by one of the STEs represented by STE symbols 294, 296, or 298, the STE represented by STE symbol 300 will continue to remain activated as long as an input symbol is present, as indicated by the "*" match-any-character designation as symbol set 356 and the STE represented by STE symbol 300 will transmit an activation along transition 358 to NOR element 358 (e.g., interpreted by the NOR element as a logical "1"), thus causing the NOR element 358 to operate as a pruning element to prevent additional results from being reported via the inverter 312 (e.g., a synchronized reporting element) by deactivating the STE represented by STE symbol 286 via transition 360 for each received input symbol once the STE represented by STE 300 is activated, as discussed in greater detail below.

An example of an analysis of an input data stream that first generates an event to be reported (e.g., an event in one of the STEs represented by STE symbols 294, 296, and 298) with respect to a fifth input symbol analyzed, as well as the subsequent pruning of any further results, is described below with respect to the graph 284 of FIG. 13. A first input symbol is transmitted to the STEs represented by 286 and 288. As any input symbol as a current input symbol generates an event with respect to symbol sets 306 and 308 (as they are an "*" match-any-character designation), transitions 310, 314, 322, and 332 are activated in response to the transmission of the first input symbol. This, in turn, causes the output of the inverter 312 to be a logical "0," as the inverter 312 inverts this received input from transition 310 to a logical "0" indicating that no event was generated and no report will be transmitted if an end of data signal is recognized by the inverter 312. The AND element 316 will output a logical "0" as transition 320, since transition 318 is deactivated (e.g., a logical "0") while transition 314 is a logical "1." Transitions 322 and 332 operate to activate the STEs represented by STE symbols 290 and 294 and transition 360 is activated (e.g., a logical "1"), since transitions 330, 342, 354, and 358 are all deactivated (thus causing the NOR element 328 to activate transition 360 in response).

Thus, as the second input symbol is received, the STEs represented by STE symbols 286, 290, and 294 are active based on the transitions activated in response to the first input symbol. As the symbol sets 306 and 334 of the STEs represented by STE symbols 286 and 290 are an "*" match-any-character designation, transitions 310, 314, 336, and 344 are activated in response to an event generated by each of the STEs represented by STE symbols 286 and 290 with respect to the second input symbol. This, in turn, maintains the output of the inverter 312 as a logical "0." Additionally, the AND element 316 will output a logical "0" as transition 320, since transition 318 is deactivated (e.g., a logical "0") while transition 314 is a logical "1." Transitions 336 and 344 operate to activate the STEs represented by STE symbols 292 and 296 and transition 360 is activated (e.g., a logical "1"), since transitions 330, 342, 354, and 358 are all deactivated. Additionally, in the present example, the second input symbol does not generate an event with respect to the symbol set 324 of the STE represented by STE symbol 294, causing the transitions 326 and 330 to remain deactivated.

As the third input symbol is received, the STEs represented by STE symbols 286, 292, and 296 are active based on the transitions activated in response to the second input symbol. As the symbol sets 306 and 346 of the STEs represented by STE symbols 286 and 292 are an "*" match-any-character designation, transitions 310, 314, 318, and 348 are activated in response to an event generated by each of the STEs represented by STE symbols 286 and 292 with respect to the third input symbol. This, in turn, maintains the output of the inverter 312 as a logical "0." Additionally, the AND element 316 will output a logical "1" as transition 320, since both transitions 314 and 318 are activated (e.g., a logical "1"). Transition 348 operates to activate the STE represented by STE symbol 298 and transition 360 is activated (e.g., a logical "1"), since transitions 330, 342, 354, and 358 are all deactivated. Additionally, in the present example, the third input symbol does not generate an event with respect to the symbol set 338 of the STE represented by STE symbol 296, causing the transitions 340 and 342 to remain deactivated.

As the fourth input symbol is received, the STEs represented by STE symbols 286, 288, and 298 are active based on the transitions activated in response to the third input symbol. As the symbol sets 306 and 308 of the STEs represented by STE symbols 286 and 288 are an "*" match-any-character designation, transitions 310, 314, 322, and 332 are activated in response to an event generated by each of the STEs represented by STE symbols 286 and 288 with respect to the fourth input symbol. This, in turn, maintains the output of the inverter 312 as a logical "0." Additionally, the AND element 316 will output a logical "0," since transition 318 is deactivated (e.g., a logical "0") while transition 314 is a logical "1." Transitions 322 and 332 operate to activate the STEs represented by STE symbols 290 and 294 and transition 360 is activated (e.g., a logical "1"), since transitions 330, 342, 354, and 358 are all deactivated. Additionally, in the present example, the fourth input symbol does not generate an event with respect to the symbol set 350 of the STE represented by STE symbol 298, causing the transitions 352 and 354 to remain deactivated.

As the fifth input symbol is received, the STEs represented by STE symbols 286, 290, and 294 are active based on the transitions activated in response to the first input symbol. As the symbol sets 306 and 334 of the STEs represented by STE symbols 286 and 290 are an "*" match-any-character designation, transitions 310, 314, 336, and 344 are activated in response to an event generated by each of the STEs represented by STE symbols 286 and 290 with respect to the fifth input symbol. This, in turn, maintains the output of the inverter 312 as a logical "0." Additionally, the AND element 316 will output a logical "0" as transition 320, since transition 318 is deactivated (e.g., a logical "0") while transition 314 is a logical "1." Transitions 336 and 344 operate to activate the STEs represented by STE symbols 292 and 296. However, while transitions 342, 354, and 358 are all deactivated, in the present example, the fifth input symbol generates an event in the STE represented by STE symbol 294. This generation of an event in the STE represented by STE symbol 294 causes activation of transition 326, which operates to activate the STE represented by STE symbol 300. The generation of the event in the STE represented by STE 294 in response to the fifth input symbol also causes activation of transition 330, which causes the NOR element 328 to output a logical "0" as transition 360.

As the sixth input symbol is received, the STEs represented by STE symbols 292, 296, and 300 are active based on the transitions activated in response to the fifth input symbol. In the present example, the sixth input symbol does not generate an event with respect to the symbol set 338 of the STE represented by STE symbol 296, causing the transitions 340 and 342 to remain deactivated. However, as the symbol sets 346 and 356 of the STEs represented by STE symbols 292 and 300 are an "*" match-any-character designation, transitions 318, 348, and 358 are activated in response to an event generated by each of the STEs represented by STE symbols 292 and 300 with respect to the sixth input symbol. As illustrated, the STE represented by STE symbol 300 is a latching STE, as indicated by the repeating arrow into STE symbol 300. Accordingly, the STE represented by STE symbol 300 will continue to remain activated as long as input data is present. In this manner, the STE represented by STE symbol 300 will continue to transmit an activation along transition 358 to NOR element 328 (e.g., interpreted by the NOR element as a logical "1"), causing the NOR element 328 to transmit a logical "0" as transition 360, which prevents the STE represented by STE symbol 286 from further analysis of any input data. Moreover, this latching of the STE represented by STE symbol 300 also would render any event generated by the STE represented by STE symbol 296 with respect to the sixth input symbol redundant, as transition 358 will be activated for any input signal. In this manner, the NOR element 328 operates as a pruning element, since it prunes (removes and fails to transmit a specific indication of) any events generated by the STEs represented by STE elements 294, 296, and 298 subsequent to a first event generated by one of the STEs represented by STE elements 294, 296, and 298.

Additionally, while transition 318 is activated in response to an event generated by the STE represented by STE symbol 292 with respect to the sixth input symbol, because the STE represented by STE symbol 286 was not active and, thus, did not receive the sixth input symbol, the AND element 316 will output a logical "0" as transition 320, since transition 314 is deactivated (e.g., a logical "0") while transition 318 is a logical "1." Additionally, since the STE represented by STE symbol 286 was not active and, thus, did not receive the sixth input symbol, transition 310 is a logical "0" with respect to the sixth input symbol, which is inverted by inverter 312 into a logical "1," indicating that an event was generated (in this case, by the STE represented by STE symbol 294). Accordingly, based on the output of the inverter 312 being a logical "1," a report will be transmitted if an end of data signal is recognized by the inverter 312.

As the seventh input symbol is received, the STEs represented by STE symbols 298 and 300 are active based on the transitions activated in response to the sixth input symbol. In the present example, the seventh input symbol does not generate an event with respect to the symbol set 350 of the STE represented by STE symbol 298, causing the transitions 340 and 342 to remain deactivated. However, even if an event was generated by the STE represented by STE symbol 298 with respect to the seventh input symbol, it would be a redundant result (and, thus, pruned by the NOR element 328), since the symbol set 356 of the STEs represented by STE symbol 300 is an "*" match-any-character designation and is activated in response to an event generated by the STE represented by STE symbols 300 with respect to the seventh input symbol. In this manner, regardless of the activation or deactivation of transition 354, activation of transition 358 to NOR element 328 (e.g., interpreted by the NOR element as a logical "1"), causes the NOR element 328 to transmit a logical "0" as transition 360, which prevents the STE represented by STE symbol 286 from further analysis of any input data.

Additionally, the AND element 316 will output a logical "0" as transition 320, since transitions 314 and 381 are deactivated (e.g., a logical "0"). Moreover, since the STE represented by STE symbol 286 was not active and, thus, did not receive the seventh input symbol, transition 310 is a logical "0" with respect to the seventh input symbol, which is inverted by inverter 312 into a logical "1," indicating that an event was generated (in this case, by the STE represented by STE symbol 294). Accordingly, based on the output of the inverter 312 being a logical "1," a report will be transmitted if an end of data signal is recognized by the inverter 312. Furthermore, for the eighth and any subsequent input symbols, only the STE represented by STE symbol 300 is active, thus precluding analysis by any of the remaining STEs represented by STE elements 286, 288, 290, 292, 294, 296, and 298 of the automaton represented by graph 284, which also precludes any additional events (subsequent to the first event generated by the STE represented by symbol 294) from being reported by the inverter 312.

In this manner, the automaton represented in graph 284 may generate a report indicating an event that satisfies Boolean clauses of a CNF Boolean expression to determine whether the CNF Boolean expression is satisfiable. This report, as well as, for example, reports generated with respect to remaining Boolean clauses of the CNF Boolean expression) indicate an event that satisfies their respective Boolean clause or no report may be generated to indicate that their respective Boolean clause was not satisfied. All of the reports may be transmitted to the host (e.g., processor 12). The host (e.g. processor 12) can then determine whether the CNF Boolean expression is satisfiable by comparing the number of reports received to the number of Boolean clauses in the CNF Boolean expression. If the number of reports received are equivalent to the Boolean clauses in the CNF Boolean expression, then the CNF Boolean expression is satisfiable. If the number of reports received are not equivalent to the Boolean clauses in the CNF Boolean expression, then the CNF Boolean expression is not satisfiable. This allows for a determination of the satisfiability of a CNF Boolean expression with transmission and reception of a minimum amount of reports (e.g., not all reports of satisfaction of the Boolean clauses are transmitted, just a record of an occurrence of the Boolean clauses being satisfied), from which the host (e.g., processor 12) can determine whether the CNF Boolean expression is satisfiable. Additionally, data transmitted to the host 12 is minimized, since only a record of a solution is transmitted to the host 12 and not all possible solutions that satisfy the CNF Boolean expression (which can be generated in connection with the non-pruning automatons in FIGS. 10 and 11).

In some embodiments, a tangible, non-transitory computer-readable medium, such as a hard drive, memory, or the like (e.g., memory 16 or external storage 18 of system 10) may be provided and may store instructions executable by a processor of an electronic device (e.g., by processor 12 of system 10). These instructions may include instructions to represent an automaton configured to generate an event representative of a satisfaction of a Boolean clause of a CNF Boolean expression representative of a SAT as a graph (e.g., a graphical representation). Examples of these graphs are illustrated by graph 160 of FIG. 10, graph 226 of FIG. 11, graph 250 of FIG. 12, and/or graph 284 of FIG. 13. However, it may be appreciated that these illustrated graphs are not exclusive and other graphs may be developed and implemented. The instructions may instructions may further include instructions to receive an input and simulate operation of the automaton of a respective graph based on the input and/or instructions to generate an indication of a result of the simulation of the operation of the automaton. In this manner, a user (for example) may be able to interface with a visual graph when developing one or more automatons to be used in satisfaction of one or more Boolean clauses of a CNF Boolean expression representative of a SAT.

While the various modifications and alternative forms are envisioned, specific embodiments have been shown by way of example in the drawings and have been described in detail herein. However, it should be understood that the embodiments are not intended to be limited to the particular forms disclosed. Rather, the embodiments are to cover all modifications, equivalents, and alternatives falling within the spirit and scope of the following appended claims.

What is claimed is:

1. A state machine engine, comprising:
an automaton, wherein the automaton is configured to:
analyze data from a beginning of an input data stream until a point when an end of data signal is seen; and
report an event representative of a satisfaction of a Boolean clause of a conjunctive normal form (CNF) Boolean expression representative of a Boolean Satisfiability problem (SAT) by a portion of the input data stream.

2. The state machine engine of claim 1, wherein the automaton comprises a state transition element comprising at least one memory element.

3. The state machine engine of claim 2, wherein the automaton is configured to report the event representative of a satisfaction of the Boolean clause of the CNF Boolean expression based on a match of the at least a portion of the input data stream with a setting of the state machine element.

4. The state machine engine of claim 1, wherein the automaton is configured to report a second event representative of a satisfaction of the Boolean clause of the CNF Boolean expression by a second portion of the input data stream.

5. The state machine engine of claim 1, wherein the automaton is configured to report only one instance of the event representative of a satisfaction of the Boolean clause of the CNF Boolean expression when multiple instances of events representative of a satisfaction of the Boolean clause of the CNF Boolean expression occur.

6. The state machine engine of claim 1, comprising a second automaton, wherein the second automaton is configured to:
analyze data from a beginning of an input data stream until a point when the end of data signal is seen; and
report an event representative of a satisfaction of a second Boolean clause of the CNF Boolean expression representative of the SAT by a portion of the input data stream.

7. The state machine engine of claim 6, wherein the second automaton is configured to report a second event representative of a satisfaction of the second Boolean clause of the CNF Boolean expression by a second portion of the input data stream.

8. The state machine engine of claim 6, wherein the second automaton is configured to report only one instance of the event representative of a satisfaction of the second Boolean clause of the CNF Boolean expression when multiple instances of events representative of a satisfaction of the second Boolean clause of the CNF Boolean expression occur.

9. The state machine engine of claim 1, wherein the automaton is configured to report the event representative of a satisfaction of the Boolean clause of the CNF Boolean expression to a host device coupled to the state machine engine.

10. An automaton implemented in a state machine engine, wherein the automaton is configured to:
   observe data from an input data stream; and
   report whether at least a portion of the input data stream satisfies a Boolean clause of a conjunctive normal form (CNF) Boolean expression representative of a Boolean Satisfiability problem (SAT).

11. The automaton of claim 10, wherein the automaton is configured to:
   observe a first occurrence of a designated start symbol in the input data steam;
   initiate observation of an occurrence of one or more target symbols in the input data stream based on the observation of the first occurrence of the designated start symbol;
   observe a second occurrence of the designated start symbol in the input data stream after the occurrence of the one or more target symbols is observed; and
   report whether one or more target symbols in the input data stream satisfies the Boolean clause of the CNF Boolean expression subsequent to the second occurrence of the designated start symbol being observed as the report of whether at least a portion of the input data stream satisfies the Boolean clause.

12. The automaton of claim 11, wherein the designated start symbol is a "\x80" symbol.

13. The automaton of claim 10, wherein the automaton comprises a plurality of state transition elements (STEs) each comprising at least one memory element.

14. An automaton implemented in a state machine engine, wherein the automaton is configured to:
   observe a current input symbol as a portion of an input data stream, wherein the current input symbol is a single character having a predetermined length; and
   report an event when the current input symbol satisfies a Boolean clause of a conjunctive normal form (CNF) Boolean expression representative of a Boolean Satisfiability problem (SAT).

15. The automaton of claim 14, wherein the current input symbol comprises a single 8-bit character as the single character.

16. The automaton of claim 15, wherein the single 8-bit character comprises seven predetermined locations in which variable set values may be located for analysis of satisfaction of the Boolean clause of the CNF Boolean expression.

17. The automaton of claim 16, wherein the single 8-bit character comprises a single predetermined location in which a separation value may be located.

18. The automaton of claim 17, wherein the automaton is configured to differentiate the current input symbol from a subsequent input as a portion of the input data stream based upon the separation value.

19. The automaton of claim 14, wherein the current input symbol comprises two consecutive 8-bit characters as the single character.

20. The automaton of claim 19, wherein the two consecutive 8-bit characters comprises fifteen predetermined locations in which variable set values may be located for analysis of satisfaction of the Boolean clause of the CNF Boolean expression.

21. The automaton of claim 20, wherein the two consecutive 8-bit characters comprise a single predetermined location in which a separation value may be located, wherein the automaton is configured to differentiate the current input symbol from a subsequent input symbol as a portion of the input data stream based upon the separation value.

22. The automaton of claim 14, wherein the single character is configured to be specified in decimal or hexadecimal notation.

23. A state machine engine, comprising:
   an automaton, wherein the automaton comprises a plurality of state transition elements (STEs), wherein the automaton is configured to:
   analyze portions of an input data stream via the plurality of STEs; and
   report an event representative of a satisfaction of a Boolean clause of a conjunctive normal form (CNF) Boolean expression representative of a Boolean Satisfiability problem (SAT) with respect to at least one portion of the input data stream.

24. The state machine engine of claim 23, wherein the automaton comprises a pruning element configured to prevent additional events of a satisfaction of the Boolean clause of the CNF Boolean expression from being reported.

25. The state machine engine of claim 24, wherein the pruning element comprises a NOR element.

26. The state machine engine of claim 23, wherein the automaton is configured to report all additional events representative of a satisfaction of the Boolean clause of the CNF Boolean expression.

27. The state machine engine of claim 26, wherein the automaton is configured to report the event and the all additional events to a host coupled to the state machine engine as an indication of all solutions of the Boolean clause of the CNF Boolean expression.

28. A tangible, non-transitory computer-readable medium configured to store instructions executable by a processor of an electronic device, wherein the instructions comprise instructions to represent an automaton configured to generate an event representative of a satisfaction of a Boolean clause of a conjunctive normal form (CNF) Boolean expression representative of a Boolean Satisfiability problem (SAT) as a graph.

29. The computer-readable medium of claim 28, comprising instructions to receive an input and simulate operation of the automaton based on the input.

30. The computer-readable medium of claim 29, comprising instructions to generate an indication of a result of the simulation of the operation of the automaton.

* * * * *